(12) United States Patent
Olson et al.

(10) Patent No.: US 7,069,468 B1
(45) Date of Patent: Jun. 27, 2006

(54) SYSTEM AND METHOD FOR RE-ALLOCATING STORAGE AREA NETWORK RESOURCES

(75) Inventors: Mark David Olson, Bloomington, MN (US); Michael Henry Pittelkow, Eden Prairie, MN (US)

(73) Assignee: Xiotech Corporation, Eden Prairie, MN (US)

( * ) Notice: Subject to any disclaimer, the term of this patent is extended or adjusted under 35 U.S.C. 154(b) by 452 days.

(21) Appl. No.: 10/183,949

(22) Filed: Jun. 28, 2002

Related U.S. Application Data

(60) Provisional application No. 60/332,653, filed on Nov. 15, 2001, provisional application No. 60/332,097, filed on Nov. 15, 2001.

(51) Int. Cl.
*G06F 11/00* (2006.01)
(52) U.S. Cl. .................. 714/7; 714/4; 714/5; 714/6
(58) Field of Classification Search ............... 714/4, 714/5, 6, 7, 9, 11, 12, 13
See application file for complete search history.

(56) References Cited

U.S. PATENT DOCUMENTS

| | | | |
|---|---|---|---|
| 6,073,218 A * | 6/2000 | DeKoning et al. .......... 711/150 |
| 6,446,141 B1 | 9/2002 | Nolan et al. |
| 6,571,354 B1 | 5/2003 | Parks et al. |
| 6,618,798 B1 * | 9/2003 | Burton et al. .............. 711/202 |
| 6,654,831 B1 * | 11/2003 | Otterness et al. ............ 710/74 |
| 6,675,268 B1 * | 1/2004 | DeKoning et al. .......... 711/151 |
| 6,789,118 B1 * | 9/2004 | Rao ............................. 709/225 |
| 6,820,171 B1 * | 11/2004 | Weber et al. ............... 711/114 |
| 2002/0188711 A1 | 12/2002 | Meyer et al. |
| 2003/0188233 A1 | 10/2003 | Lubbers et al. |
| 2003/0212031 A1 | 11/2003 | Hetrick et al. |
| 2003/0217308 A1 | 11/2003 | Krehbiol, Jr. et al. |
| 2004/0078632 A1 * | 4/2004 | Infante et al. ................ 714/5 |
| 2004/0148380 A1 * | 7/2004 | Meyer et al. ............... 709/223 |

* cited by examiner

*Primary Examiner*—Scott Baderman
*Assistant Examiner*—Timothy M. Bonura
(74) *Attorney, Agent, or Firm*—McDermott Will & Emery LLP

(57) ABSTRACT

A fiber channel storage area network (SAN) provides virtualized storage space for a number of servers to a number of virtual disks implemented on various virtual redundant array of inexpensive disks (RAID) devices striped across a plurality of physical disk drives. The SAN includes plural controllers and communication paths to allow for fail-safe and fail-over operation. The plural controllers can be loosely-coupled to provide n-way redundancy and more than one independent channel for communicating with one another. In the event of a failure involving a controller or controller interface, the virtual disks that are accessed via the affected interfaces are re-mapped to another interface in order to continue to provide high data availability. In particular a resource re-allocation routine operating on one of the controllers employs predetermined criteria against a family of potential back-up controllers in order to select appropriate back-up controllers for a particular device that fails. The criteria, for example, can include an explicit primary/secondary table to control selecting a secondary controller for any primary controller or be more complex so as to consider such statistics as data transfer loads among the interfaces, data transfer loads among the controllers, or the number of targets assigned to each interfaces.

13 Claims, 11 Drawing Sheets

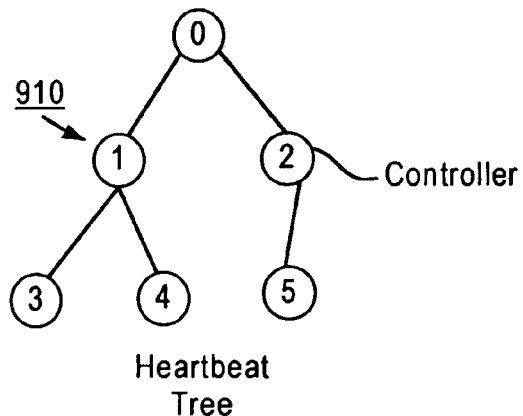
NCG Controller Table
FIG. 9A
Heartbeat Tree
FIG. 9B
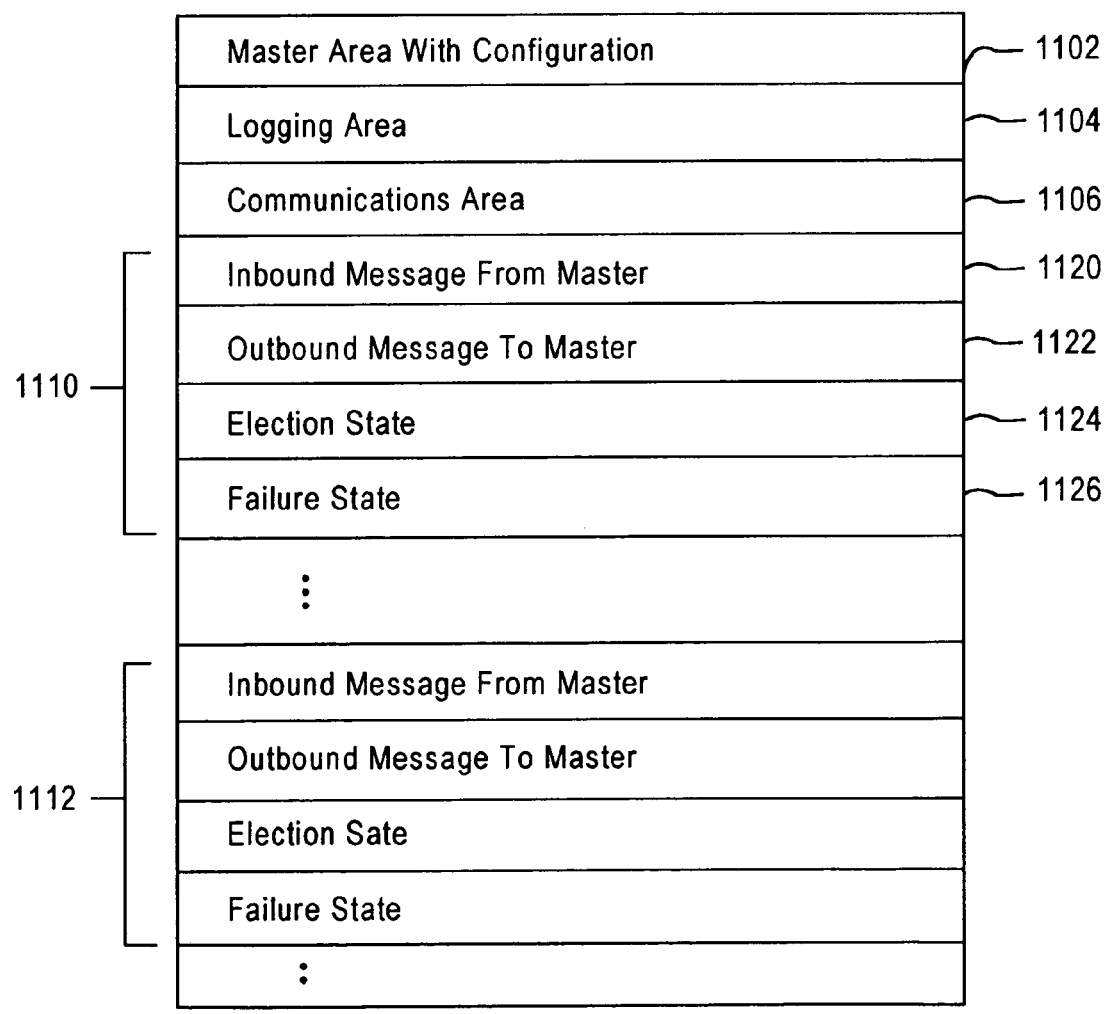
FIG. 11

SYSTEM AND METHOD FOR RE-ALLOCATING STORAGE AREA NETWORK RESOURCES

RELATED APPLICATIONS

This application relates to and claims priority from U.S. Application Ser. No. 60/332,653 filed Nov. 15, 2001 entitled INTERPROCESSOR COMMUNICATION AND FAILURE MANAGEMENT FOR A MULTI-CONTROLLER STORAGE SYSTEM and U.S. Application Ser. No. 60/332,097 filed Nov. 15, 2001 entitled FAULT TOLERANT MULTI-CONTROLLER STORAGE SYSTEM, the disclosures of both of which are hereby incorporated by reference in their entirety.

FIELD OF THE INVENTION

The present invention relates to storage area networks and, more particularly, to fault-tolerant storage area networks.

BACKGROUND OF THE INVENTION

One of the most critical needs for computing platforms involves that of mass storage. Mass storage has typically been implemented as hard disk drives connected to an internal bus, or backplane, of an individual workstation. For example, SCSI or IDE drives, that range from hundreds of megabytes to gigabytes, are attached to controller interface cards or chips that plug into a workstation's bus. This type of local mass storage is accessed by way of the workstation's operating system which recognizes the filesystem commands generated by user applications and translates them into low-level bus protocols for accessing the hardware of the local mass storage. These hardware accesses typically are performed in predetermined block sizes and are, therefore, often called block protocols. With the advent of networks and networked computers, individual workstations were able to utilize mass storage devices on remotely located servers in addition to any local mass storage. The use of networked servers, however, requires that the workstations (or clients) and servers communicate via methods that include the overhead of a distributed filesystem (e.g., NFS) and any layered networked protocols (e.g., TCP/IP). Only the server is able to access its own local storage using low-level, or block, commands.

Networked attached storage (NAS) and storage area networks (SANs) are two recent technologies that attempt to allow computers to access network-connected hard disk drives and other mass storage devices using block-level commands so that the networked storage appears to be accessed as if it were physically attached to the workstation. In a NAS, the storage device connects directly to the network medium and does not require an intermediate server to provide access to the storage. In a SAN, a separate network of storage devices forms storage space that is allocated to different workstations and this separate network is itself connected to the network medium which connects the different workstations.

Conventional SANs do not perfectly solve all the mass storage needs for an enterprise. In particular, maintenance and provisioning of the storage space within the conventional SAN is difficult to accomplish and wasteful of physical resources. To address these concerns, many recent developments in this field have involved virtualizing the storage space so that there is little, or no, correlation between the physical disk drive devices where the data actually resides and the logical disk drive devices which are the targets for a workstation's data access request. One such currently-produced product that is known in the industry and provides a substantially virtualized view of the storage space within a SAN is the MAGNITUDE® SAN manufactured by Xiotech Corporation.

The MAGNITUDE® SAN aggregates physical drives into a centralized "virtualized" storage pool and has the ability to stripe across and utilize all available space in a centralized storage pool. From this pool, a user carves out storage into "virtualized disks" and assigns that storage to whichever workstation that needs it. Within the SAN, the workstations see the MAGNITUDE® SAN's virtual disks as Logical Unit Numbers (LUNs). Within MAGNITUDE®SAN, virtualization refers to different levels of logical constructs rather than to physical storage devices (e.g. SCSI hard disk drives).

The basic MAGNITUDE® SAN system includes up to 32 SCSI hard drives on plural SCSI busses, although an expansion box is available to double the system size. A configurable number of virtual disks and virtual RAID devices (or arrays) are arranged across these drives. A virtual disk can comprise one or more of the virtual RAID devices. Each of these virtual disks are presented to one or more remote workstations on a Fibre Channel network as an addressable disk drive that appears and acts like local storage (i.e., an available local drive).

Conventional RAID arrays are well-known and according to the typical rules defining various RAID levels, data is "striped" across more than one physical drive. A "stripe" refers to the number of disk sectors written to each physical drive before data is written to the next drive in the RAID array. Each drive is divided into stripes with data being written to the first stripe in each of the drives and then to the second stripe in each drive, until the drives have reached capacity. Depending on the particular level of RAID being used, stripes can be mirrored or can have parity stripes interspersed among the data stripes in different patterns.

One recent extension to conventional RAID is that more than one similar RAID device can be arrayed across the same physical disks. In this environment, each physical drive is identically partitioned into multiple partitions irrespective of the available capacity. One RAID device is arrayed across each of similarly numbered partitions among the physical drives; another RAID device can be arrayed across other similarly numbered partitions among the same physical drives. The rules and techniques for striping and mirroring remain the same, the difference being that the partitions are considered as the boundaries of a RAID device rather than the physical drives themselves.

Within the MAGNITUDE® SAN system, however, RAID devices are "virtualized" arrays as well. For example, when a user provisions a new virtualized disk, the selected RAID level may specify that two data stripes will occur and then the third stripe will be a parity stripe. In a traditional RAID array, this would mean that three physical hard drives are used. However, in MAGNITUDE® SAN, the "virtualized" RAID device can use all the physical devices (e.g., 30) having sufficient capacity to stripe the data and parity irrespective of the selected RAID level. The striping occurs according to the selected RAID level but is not dependent on the particular physical arrangement of the drives When a user provisions a new virtualized disk, a size is specified. The specified size is divided by the number of available physical drives to determine the maximum amount of space needed on each physical drive for the virtualized disk. Those physical drives that have sufficient capacity are made part of a virtualized RAID device. If a physical drive does not have the required capacity, then that physical drive is not included in the virtualized RAID device.

The MAGNITUDE® SAN is responsible for presenting the available virtualized disks as addressable devices on the Fibre Channel fabric. As a result, the remote workstations need only generate a typical block-level command (e.g., SCSI-3 command) to access blocks on an available logical drive. The MAGNITUDE® SAN, however, receives this conventional protocol request and converts it into a virtual request packet (VRP) for internal processing. The MAGNITUDE® SAN internally unencapsulates, parses and processes a VRP message utilizing translation tables in order to eventually generate SCSI commands to access multiple SCSI devices.

The MAGNITUDE® SAN first translates the data request within the VRP message to a request involving the particular virtualized disk that corresponds to that target drive for that requestor (e.g., Fibre Channel device #7 requests access to their E: drive which corresponds to virtual disk 71). The MAGNITUDE® SAN then translates the identified virtualized disk data request into a request for the specified data from a particular virtualized RAID device on which the virtualized disk is arrayed (e.g., virtualized RAID device 37 corresponds to virtualized disk 71); and another translation then takes place to convert the data request into appropriate sector requests from individual, physical SCSI hard drives that make up the particular virtualized RAID device (e.g., virtualized RAID device 37 is comprised of physical SCSI drives 1, 3, 5, 7, 15, 16, 18, 19, 24, 26, and 30; and the requested data is within sectors striped on physical SCSI drives 18, 19, 24 and 26).

The MAGNITUDE® SAN enforces access controls at the virtualized disk level. Individual virtualized disks can be assigned to a specific workstation to allow the workstation and its storage to be isolated from another workstation and its storage.

Within the MAGNITUDE® SAN system, for example, there is a single controller that performs the many levels of translations needed to permit receiving a request involving a virtualized drive and actually performing data accesses to multiple physical devices. Thus, while the use of RAID provides some failure protection for the data, fail-over or fail-safe behavior is not implemented at the system level as the controller is a single point of failure.

There remains the need, therefore, for a virtualized SAN system that includes plural controllers in order to provide fault-tolerance and fail-over operation in a manner which benefits performance, is simple to implement, costs less than specially designed redundant processor systems, and is easily extensible. With the availability of redundant controllers and the ability to redistribute SAN resources after a failure occurs, one issue that arises which needs addressing, is that of determining which controller among the possibly available controllers is a good choice to become the back-up controller.

SUMMARY OF THE INVENTION

These and other needs are met by embodiments of the present invention which provide virtualized storage via a SAN and include plural controllers and communication paths to allow for fail-safe and fail-over operation. In certain embodiments, the plural controllers are loosely-coupled to provide n-way redundancy and have at least three independent channels for communicating with one another. In particular a resource re-allocation routine operating on one of the controllers employs predetermined criteria against a family of potential back-up controllers in order to select appropriate back-up controllers for a particular device that fails. The criteria, for example, can include an explicit primary/secondary table to control selecting a secondary controller for any primary controller or be more complex so as to consider such statistics as data transfer loads among the interfaces, data transfer loads among the controllers, or the number of targets assigned to each interfaces.

One aspect of the present invention relates to a storage area network that includes more than one front-end interface that provides, to a number of servers, access to one or more associated targets. The storage area network also includes means for determining to which of the plurality of front-end interfaces to move any target associated with any one of the front-end interfaces.

Another aspect of the present invention relates to a storage area network that includes plural front-end interfaces. Each of these front-end interfaces provides, to a plurality of connected servers, access to one or more targets associated with that interface. Within the storage area network, there is also a resource management application that is configured to determine to which of the plurality of front-end interfaces to move any target associated with a particular front-end interface. For example, if the particular front-interface fails then the resource management determines which other front-end interface will assume ownership of its targets.

An additional aspect of the present invention relates to a method useful in a storage area network comprising plural, loosely-coupled redundant controllers which, together, include a plurality of front-end interfaces, each front-end interface having associated targets. The purpose of the method is to determine to which front-end interface to fail-over a target associated with a particular front-end interface. According to the method, an operational failure on an interface is identified and any targets owned by that interface are also identified. The method then determines, for each of the identified targets, which of the front-end interfaces will become the fail-over interface for that target.

BRIEF DESCRIPTION OF THE DRAWINGS

The present invention is described with reference to the following figures:

FIG. 9A illustrates a VCG controller table in accordance with an embodiment of the present invention and FIG. 9B illustrates the VCG controllers arranged in a heartbeat tree in accordance with an embodiment of the present invention;

FIG. 11 illustrates an exemplary layout of the reserved area in accordance with an embodiment of the present invention.

DETAILED DESCRIPTION OF THE INVENTION

In the following description, for purposes of explanation, numerous specific details are set forth in order to provide a thorough understanding of the present invention. It will be apparent, however, to one skilled in the art that the present invention may be practiced without these specific details. In other instances, well known structures and devices are shown in block diagram form in order to avoid unnecessarily obscuring the present invention.

Exemplary Storage Area Network

Figure 1:
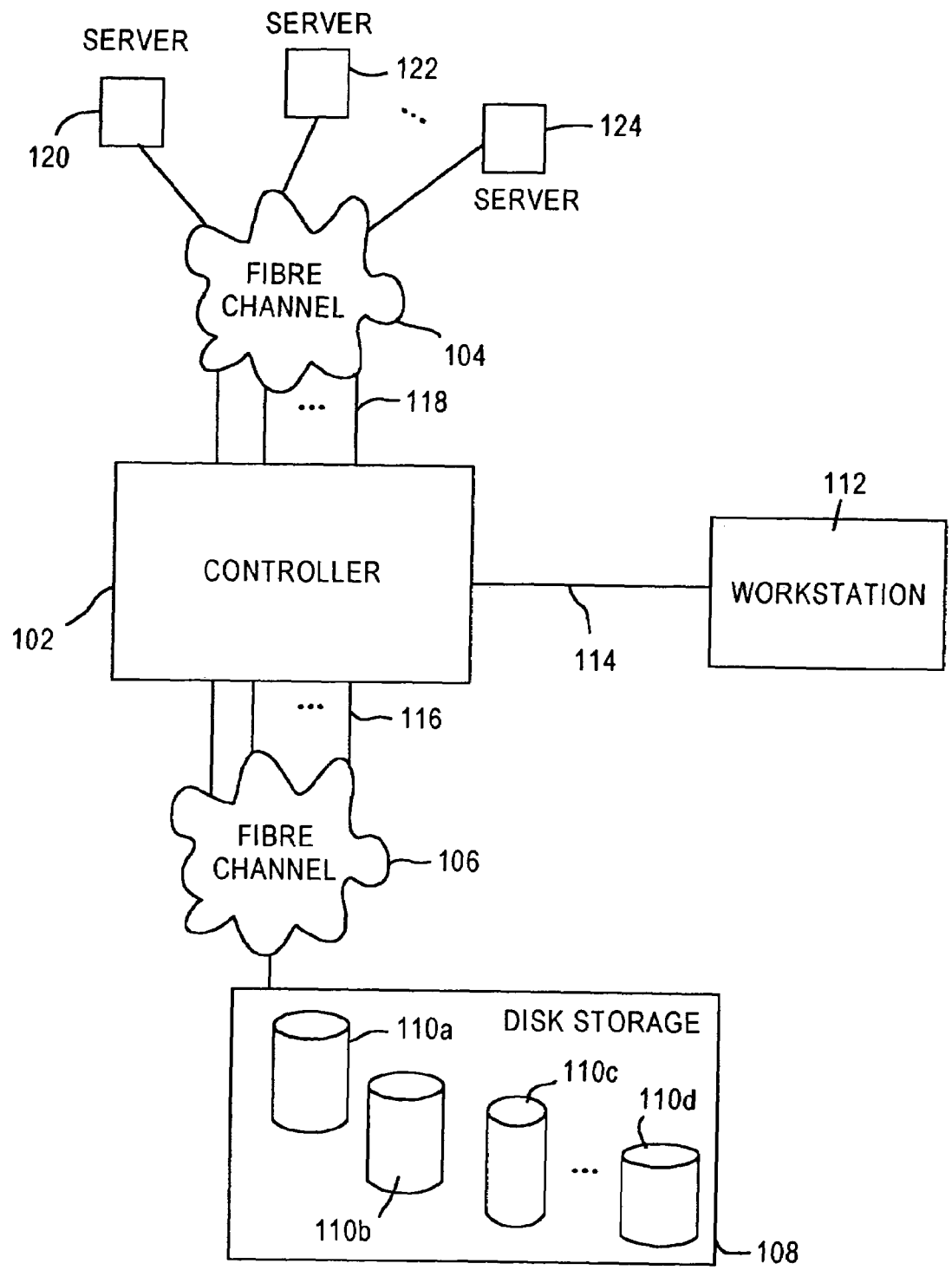
FIG. 1 illustrates an exemplary fibre channel storage area network (SAN)

FIG. 1 depicts an exemplary storage area network environment 100. Embodiments of the present invention can provide conventional functionality and operation within this environment 100. In particular, a number of individual disk drives 110a–110d are connected together to form a storage subsystem 108. This storage subsystem 108 is connected via fibre channel media 106 and protocols to different back-end interfaces 116 of a controller 102. The disk storage subsystem connections as depicted in FIG. 1 are schematic in nature. The actual physical connection topology of the different disk drives 110a–110d to the controller 102 is not explicitly depicted in FIG. 1, as numerous different topologies are recognized to be functionally equivalent. One exemplary topology may be to have four fibre channel loops, each loop having plural hard drives and each loop connected to a different interface 116 of the controller 102. The exemplary network environment 100 is implemented using fibre channel; however, the use of other present and future-developed networking technologies providing similar functionality are also contemplated.

Within the environment 100, a number of servers 120–124 are connected to various front-end interfaces 118 of the controller 102. These connections also utilize fibre channel media 104 to provide various connection topologies between the servers 120–124 and the controller 102. For example, the fibre channel media 104 can include one or more switches having respective output ports connected to a front-end controller interface 118 and input ports connected to individual servers 120–124 or loops of individual servers.

The controller 102 is responsible for presenting storage space to the servers 120–124 by directing and controlling access to the disk storage subsystem 108. This access is not dependent on the underlying physical arrangement and structure of the disk drives 110a–110d; but, rather, is provided in a virtual (or logical) manner so as to simplify maintenance and management of the storage space made available to the servers 120–124. In operation, the controller 102 presents to each server 120–124 respective logical disk drives which can be accessed as if they were physical disk drives connected to the server. The servers 120–124 send data access requests (e.g., read, write, copy, etc.) to the controller 102 directed to a particular logical disk drive and the controller 102 translates the request into commands that access data on the physical drives 110a–110d. For example, with a read request, the controller 102 also arranges any retrieved data and provides it back to the requesting server 120–124.

The creation and modification of the storage configuration implemented by the controller 102 is accomplished via a workstation 112. The workstation 112 connects to the controller 102 via a network connection 114, such as Ethernet, and interfaces with a storage configuration routine that executes within the controller 102. The storage configuration routine, for example, can be presented via a web server and a user can configure the controller 102 using a web browser on workstation 112. Alternatively, the storage configuration routing can be standalone application that communicates with the workstation 112 via TELNET or possibly a proprietary client application. Utilizing the storage configuration routine, a user such as a system manager or administrator can define the storage space (and its configuration) that is allocated to each of the servers 120–124. The specific algorithm and manner in which the physical disk drives 110a–110d are presented as virtual disk spaces to the servers 120–124 are not critical to the understanding of the exemplary embodiments of the present invention; accordingly this virtualization is described so as not to obscure the present invention but, rather, is described with sufficient detail to allow a clear understanding of the many aspects of the present invention.

For example, to allocate storage to server 122, a user interfaces with the storage configuration routine to specify that a new disk is needed; this new disk is a logical, or virtual, disk rather than a physical disk. The user assigns this new disk a logical unit number (LUN) associated with the particular server 122 and specifies the capacity of the virtual disk (e.g., 2 Gigabytes). The user also specifies which interface 118 will appear to have the virtual disk connected to it. Additionally, the user specifies the RAID level for the new virtual disk so as to provide some assurance of data availability. The RAID level can specify striping arrangements such as stripe levels, parity stripes, data stripe size, and even mirroring levels. Using the virtual disk specification provided by the user, the controller 102 determines, and maintains a table that reflects, which sections of the physical drives 110a–1110d are used to construct the new virtual disk. The controller 102 maintains this table information for all the virtual disks that are defined and services data requests from the servers 120–124 using this information. Each of these virtual disks are, in general, said to be "owned" by the controller 102 and, more particular, are "owned" by the respective interface 118 associated with it.

Within the fibre channel protocol, there are many features which simplify adding and modifying devices on a fibre channel medium. Embodiments of the present invention take advantage of these underlying aspects of fibre channel simply by incorporating standard fibre channel interface host bus adapters and fibre channel switches and hubs. For example, fibre channel allows automatic retries when a request times out; uses acknowledgment signals to track the completion of a request; allows automatic path discovery (for example, between the controller 102 and the disk drives 110a–110d); and allows devices newly added to a medium to be announced and discovered by the other devices on that medium. The fibre channel protocol also utilizes the concept of a "target". A target is a uniquely identified endpoint for a communication request. For example, when a fibre channel device initiates a request, it will specify a target for that request using the unique target identifier. The most simple example is a target having a one-to-one correspondence to a physical device such as a disk drive or a workstation. However, in practice, a single physical device can have multiple ports (logical or physical) and each of these ports can be a distinct target. Within fibre channel networks, the use of worldwide names (WWNs) and port numbers have come to be the standard way to uniquely identify a target. Conventionally, the WWN is a configurable hardware identifier associated with a fibre channel interface.

Within certain embodiments of the present invention, the controller 102 provides a different target identifier for each virtual disk that it owns. Accordingly, the table information which implements the storage configuration for a controller 102 includes the following relationships:
   a) which areas of which physical drives correspond to a particular virtual RAID device;
   b) which virtual RAID device(s) corresponds to which areas of a particular virtual disk;
   c) which virtual disk corresponds to a particular server/LUN pair;
   d) which server/LUN pair corresponds to a target; and
   e) which interface owns a particular target.

Utilizing this information, the servers 120–124 are able to determine which interface 118 to send a particular request to (based on the target identifier). The controller 102 receives a data request on an interface 118 and, through a process of multiple translations using the configuration information, accesses the appropriate physical drives 110a–110d to satisfy the request.

Exemplary SAN Controller

Figure 2:
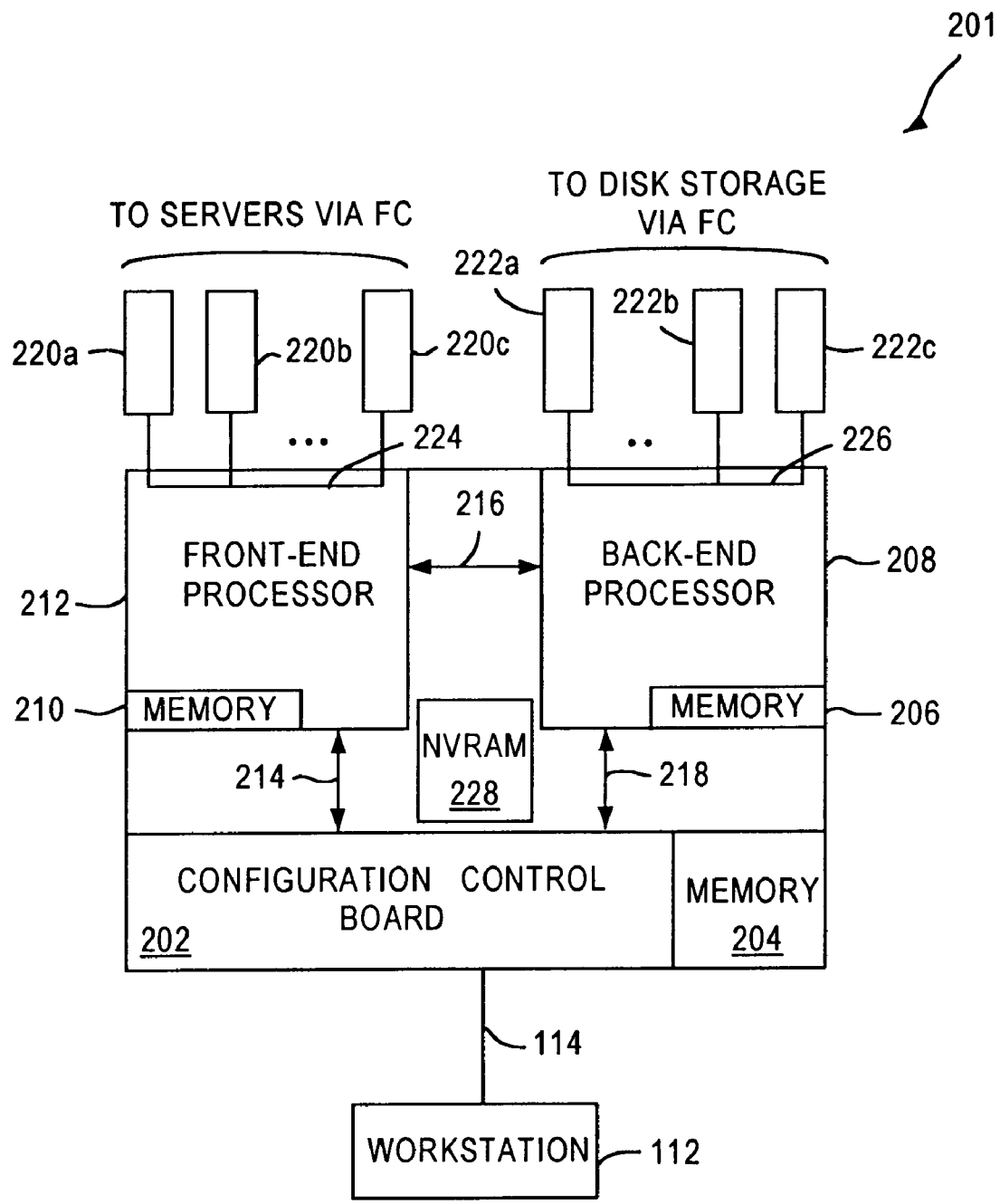
FIG. 2 illustrates an exemplary storage controller in accordance with an embodiment of the present invention.

FIG. 2 provides a more detailed view of an embodiment of a SAN controller 201. According to this embodiment, the controller 201 comprises three major processors—the front-end processor 212, the back-end processor 208, and the configuration and control board (CCB) 202. Also included within the controller 201 is NVRAM 228, or other functionally equivalent storage, that is accessible by the front-end 212 and back-end 208 processors to retain a copy of the storage configuration information.

The front-end processor 212 is coupled via a bus 224 to plural fibre channel host bus adapters (HBAs) 220a–220c and executes firmware code to perform its operations. In one specific embodiment, the bus 224 is a PCI bus and the HBAs 220a–220c are Qlogic® Fibre Channel interface boards. Each HBA 220a–220c connects with one or more of the servers 120–124. This side of the controller 102 is referred to as the "front-end" or the "host end" which makes the HBAs 220a–220c "host interfaces". The front-end processor 212 also includes memory 210 having a section that caches incoming and outgoing commands and data, and another section of memory 210 that stores the front-end processor's firmware. Incoming disk access requests are received via the host interfaces 220a–220c. The front-end processor 212 uses the configuration information in NVRAM 228 to determine which blocks of the virtual disk the access request relates to and then passes this information to the back-end processor 208.

The front-end processor 212 and back-end processor 208 are connected via a bus 216, such as a PCI bus. The back-end processor 208 is coupled via a bus 226 to plural fibre channel host bus adapters (HBAs) 222a–222c and executes its own firmware code to perform its operations. In one specific embodiment, the bus 226 is a PCI bus. Each HBA 222a–222c connects with one or more of the physical disks 110a–110d; a HBA is synonymous with a host adapter board (HAB) which reflects terminology used by some vendors. This side of the controller 201 is referred to as the "back-end" or the "device end" which makes the HBAs 222a–222c "device interfaces". The back-end processor 208 also includes memory 206 having a section that caches incoming and outgoing commands and data; another section of the memory 206 stores the back-end processor's firmware. The back-end processor 208 will receive from the front-end processor 212 information about a virtual disk access request and generate the actual, physical disk access commands to access the various blocks of the physical disk drives 110a–110d which correspond to the requested blocks of the virtual disk access request.

The CCB 202 is connected to both the front-end 212 and back-end 208 processors, respectively, by busses 214 and 218 which, for example, can be PCI busses. One alternative to the separate busses 214–218 depicted in FIG. 2 is a single bus that connects all three components 202, 208 and 212. The CCB 208 includes a number of executable routines that allow monitoring of the health of the different controller components, collecting statistics regarding the storage system 108, reporting the status of the controller 201 and the storage subsystem 108 to the workstation 112, performing automatic scripts such as backing-up, copying or mirroring data within the storage system 108, and allow a user to configure the storage space owned by the controller 201.

Configuration and Control Board

Figure 3:
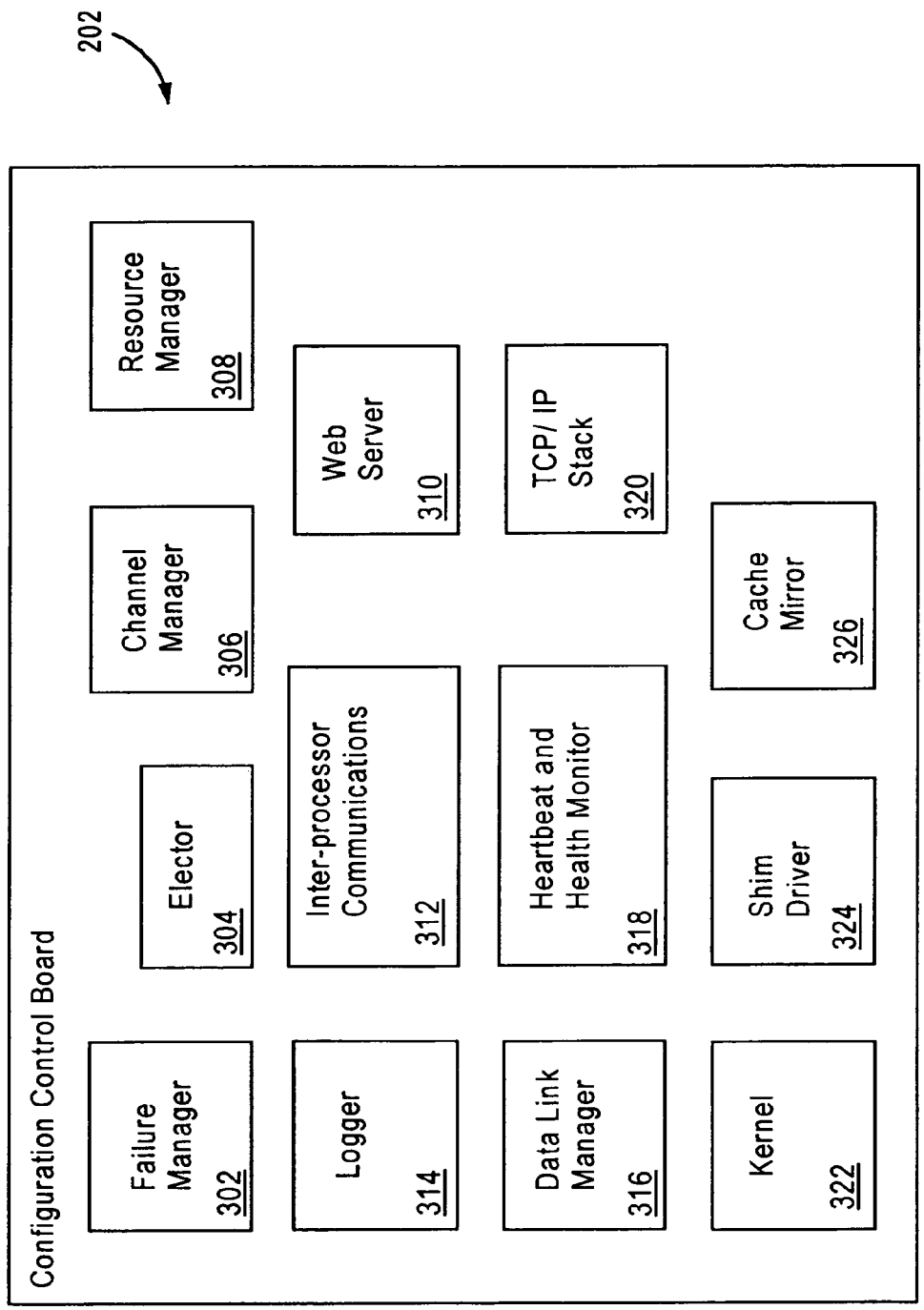
FIG. 3 illustrates and exemplary configuration and control board (CCB) in accordance with an embodiment of the present invention that is useful in the storage controller of FIG. 2.

FIG. 3 depicts a more detailed view of exemplary executable applications or routines that run on the CCB 202 according to one embodiment of the present invention. The actual hardware of a CCB 202 is not depicted in FIG. 3 but will typically comprise a network interface (such as an i82559 Ethernet Controller), a processor (such as an Intel i960), memory (e.g. RAM, Flash RAM, NVRAM), timer circuitry, and interface circuitry for communicating with the front-end 212 and back-end 208 processors over busses 214 and 218. The CCB 202 includes management functionality similar to that available from conventional SAN controllers. In other words, the CCB 202 includes an interface for receiving configuration instructions and performing all the complex steps needed for allocating and provisioning storage space accordingly. The functions of the CCB 202 can include, for example, configuring and controlling RAID devices, configuring and managing server connections, maintaining system event logs, monitoring environmental and power conditions, recording operation statistics, providing notification of failures, and performing diagnostics.

The CCB 202 also includes an executable kernel that works with the front-end 212 and back-end 208 processors to provide control of a SAN (e.g., SAN 500 of FIG. 5) during operation. These processors 208, 212, typically resident on a processor board and providing data I/O, permit detection of failures of any physical disk drives 110a–110d and identification and substitution of a hot spare. Once the processor board indicates to the CCB 202 that there is a problem and/or identifies a hot spare, the CCB 202 can perform its functions of logging, notification and reconfiguration as appropriate. Additionally, the CCB 202 works with the processor board to provide link and path discovery to determine a) if a complete, working communications channel exists between an front-end HBA 220a–220c and another connected endpoint; b) if a complete working communications channel exists between each back-end HBA 222a–222c and physical disk drives 110a–110d; and c) if an end-to-end channel exists between the front-end and the back-end processors. Instead of describing all of these aspects of the CCB 202 in detail, those aspects of CCB 202 which are more directly involved in providing functionality which relates to loosely-coupled plural controllers arranged to provide fault tolerant behavior are described below.

The operation of the CCB 202 is controlled by the kernel 322. This kernel 322 provides the operating environment in which the other applications and routines in the CCB 202 will function. As described later, a controller 102 can operate in one of two modes (i.e., a master controller mode and a slave controller mode). Based on which mode the controller 201 is operating in, the kernel 322 determines which routines and applications can execute and which ones are disabled.

The CCB 202 includes a network protocol stack 320 such as a TCP/IP network protocol stack. This stack allows the CCB 202 to communicate over a network in addition to any connections involving fibre channel protocols. The CCB 202 also includes a web server 310 that provides an interface to a user to configure the SAN. The user will typically connect to the web server 310 via a workstation coupled to the TCP/IP network and then define the virtual disks that are presented on the SAN's front-end. Logging of the controller's ongoing operations is provided by a logger 314 that locally stores log information or can send messages indicating critical log events to external personnel. If more than one controller is working together, the logger 314 in one controller can forward log messages to another controller's logger which, in turn, can consolidate all the messages and send them to a user's workstation connected to the TCP/IP network.

Other specific applications and routines in the CCB 202 include a failure manager 302 that is responsible to handle a detected failure or, if unable to handle the failure, forward the failure notification to another failure manager in another controller that can handle the failure. The failure manager 302 works closely with the resource manager 308. The resource manager 308 determines what configuration changes must occur in response to the detected failure. The resource manager 308 then ensures that these configuration changes are shared with every controller that may be operating in a cooperative, fault-tolerant arrangement. The elector 304 executes to perform an election process among all cooperatively operating controllers to identify a "master" controller and, thus, provides means for cooperatively determining which of the devices will operate as the master device. The election process ensures that a master controller is chosen and that only one master controller is chosen. It is on the CCB 202 of this master controller that the resource manager 308 runs. As a result, contention among plural controllers 201 is avoided by limiting the generation of any configuration changes to only a single controller 201.

Embodiments of the present invention permit portions of the physical hard drives to be utilized for message passing and configuration storage involving any controllers connected to those hard drives. Access and use of these reserved areas of the hard drives are controlled by a channel manager application 306 that operates to permit a controller 201 to read and write data to the reserved areas. The CCB 202 of controller 201 also includes a communications manager that allows reading and writing of data via the front-end fibre channel links; this manager is the data link manager (DLM) 316. A shim driver 324 is included in embodiments of the present invention to allow the data link manager 316 to use some of the features of the TCP/IP stack 320. Because the DLM is communicating via fibre channel, not TCP/IP, some type of software "bridge" or shim is needed for these different protocols to share resources which functionality is provided by the shim driver 324. The CCB 202 also includes heartbeat and health monitors 318 (HAH). Although using "heartbeats" to detect the continuing operation of a connected device is a common practice, embodiments of the present invention include heartbeats that involve intra-controller operations as well as inter-controller operations. A cache mirror manager 326 is also a helpful routine that can be used to improve performance of disk access operations. The cache which is managed by the cache mirror manager 326 is typically the front-end write cache that stores data to be written to a virtual disk (and eventually to the physical disk drives). Instead of forcing every routine shown in FIG. 3 to be designed for all external and internal communications involved with a controller, these routines can take advantage of an inter-process communications library 312 that includes the functions and routines necessary for robust communication within, and between, different controllers.

Redundant SAN Controllers

While the general idea of redundant components has been utilized in a variety of situations as a way to improve different aspects of a system's reliability, embodiments of the present invention include redundant controllers specifically arranged and coupled within a storage area network environment so as to simply, easily and extensibly support improved fault and failure tolerance.

In many computer related environments, redundant processors are arranged in such a manner as to nearly double the hardware, costs and complexity without providing any additional performance benefit. In these types of arrangements, a redundant processor or other component "shadows" the operations of the active component. When the active component fails, the redundant component steps into its place and continues operation. However, while the active component is functioning properly, the redundant component is not performing any independently beneficial activity such as increasing data throughput. Nearly all computing platform related redundant systems are known as "tightly-coupled". This means that each of the redundant components is specially designed to operate in conjunction with the other redundant component. In addition, the other system components which are used by the redundant components are also specially designed for their purpose. Within many high-performance redundant processor computer systems for example, the processors and their bus structures are not designed the same as a stand-alone processor but are specially designed to work so that either processor can seamlessly perform the functions of the other in case of a failure. This requires precise storage of state information after each atomic action by the system and the need for memory and other components to be dual-ported so that access from both processors can easily occur. As a result, any benefits of a tightly-coupled redundant system come at a high premium with respect to both cost and complexity. Additionally, the increase in complexity is exponential as the number of any redundant component is increased. Accordingly, redundant systems do not scale well and most are implemented so that redundancy is provided by only a pair of redundant components.

In contrast to the conventional type of redundant systems described above, embodiments of the present invention provide plural controllers in a "loosely-coupled" system. A loosely-coupled system is characterized in that each of the plural components (i.e., the controllers) is an independently operable component, which is to say that each controller can function to provide storage access without requiring that another redundant controller exist. Each of plural controllers can perform their own storage related functions but also include communication channels to exchange messages with any other controllers that happen to exist. Thus, higher throughput of data between the servers 120–124 and the storage system 108 is achievable over a single controller arrangement because the plural controllers can perform parallel, independent accesses to the storage system 108. Also, each controller is substantially similar to an individual controller 102 and, therefore, design complexity and costs are not significantly different. This arrangement of loosely-coupled plural controllers, which is more easily referred to as a "virtual controller group" (VCG) is easily extensible so that 3, 4, 5, . . . n-way redundancy is achieved simply by connecting additional plural controllers as described herein with respect to different embodiments of the present invention.

Virtual Controller Group

Figure 4:
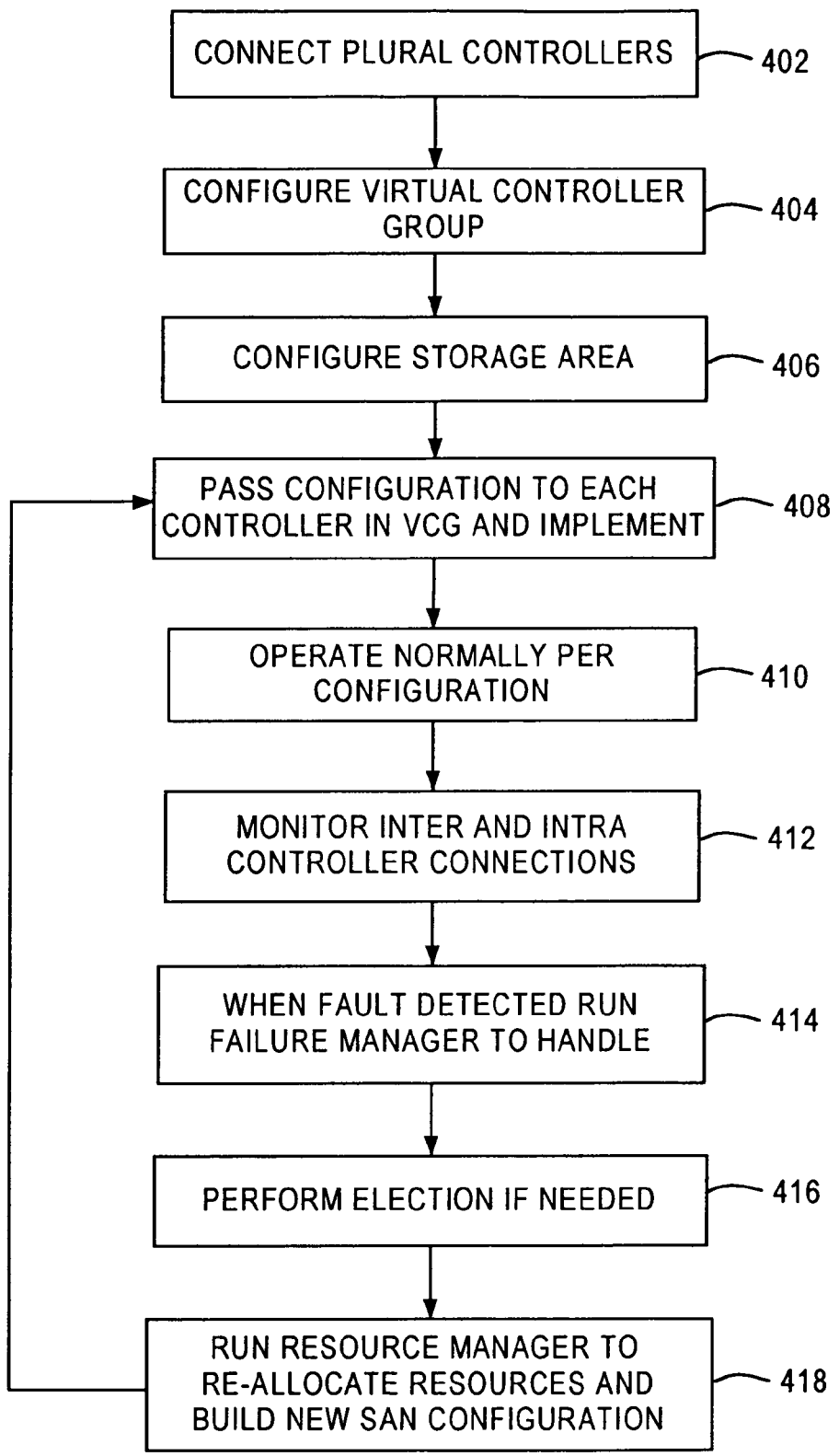
FIG. 4 depicts an exemplary logical flow diagram of a method for configuring plural loosely-coupled storage controllers in accordance with an embodiment of the present invention.
Figure 5:
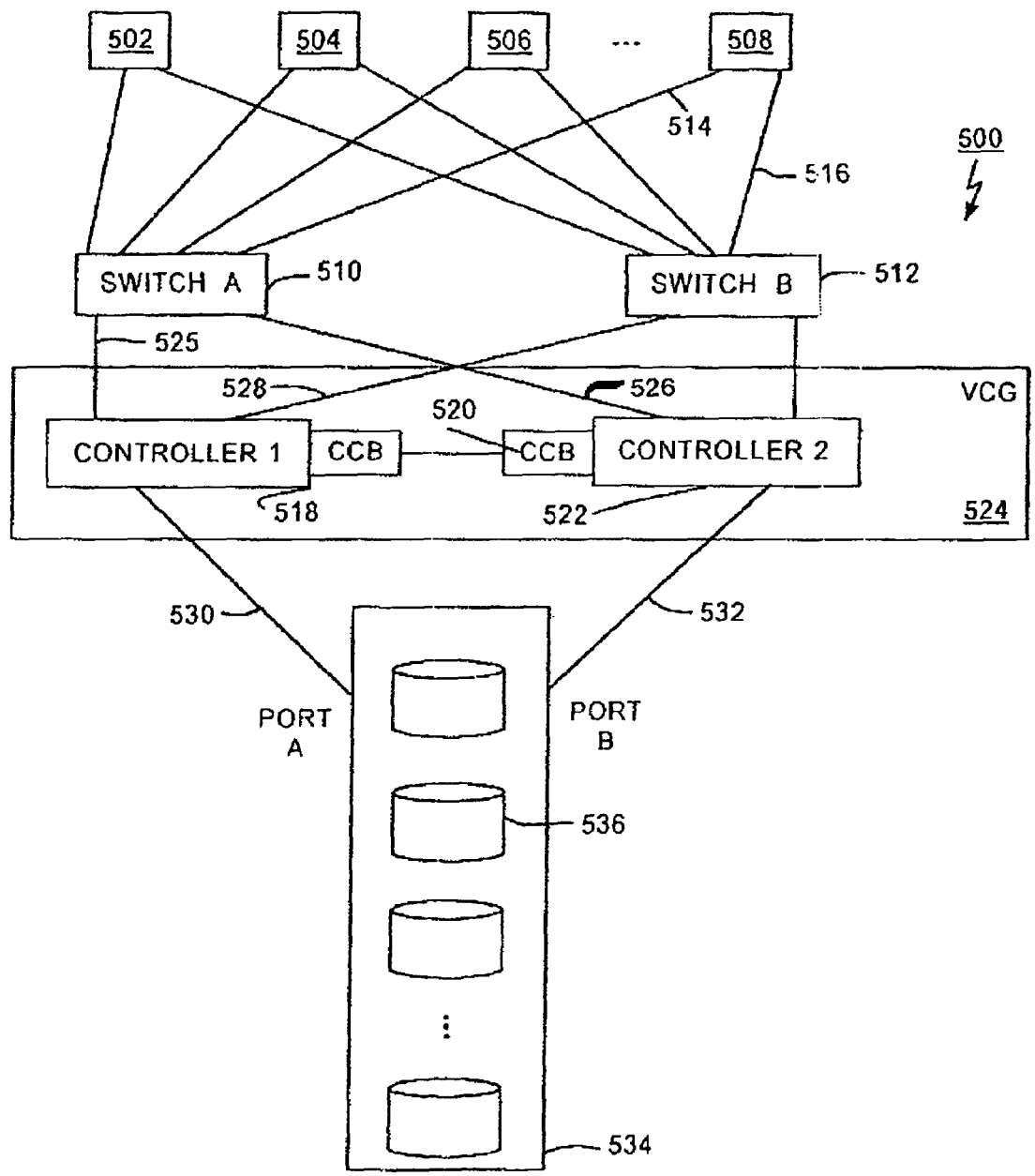
FIG. 5 illustrates an exemplary virtual controller group (VCG) in accordance with an embodiment of the present invention.

FIG. 4 depicts a logical flow diagram of the operation of plural controllers in accordance with an embodiment of the present invention. The description of FIG. 4 references FIG. 5 which illustrates a SAN 500 advantageously employing one of the many plural controller arrangements that are in accordance with embodiments of the present invention. For example, FIG. 5 illustrates an exemplary environment in which more than one controller 201 (see FIGS. 2 and 3) operate together to provide redundancy.

In step 402, the first and second controllers 518, 522 are connected in the SAN 500 to form a virtual controller group 524. Although different element numbers are being used to designate the controllers 518, 522, these controllers are substantially similar in functionality to the exemplary single controller 201 described in relation to FIGS. 2 and 3. Within a VCG 524 the different controllers 518, 522 act like peers in the sense that each can perform their own storage access functions. However, the conventional terminology of "slave" and "master" is helpful when describing the VCG 524 to distinguish between a current master controller and the other controllers. There is only one master controller in a VCG at any given instant. In addition to the configuration information a controller normally stores regarding the virtual storage it controls, this configuration information, in the plural controller environment 500, will now include the identities and the configurations of the other, different controllers in the VCG 524.

One possible concern regarding additional complexity within embodiments of the present invention arises because each CCB of the first and second controllers 518, 522 in the VCG 524 can potentially be a source of configuration information, coordination of failure detection and reporting, and SAN resource management. However, permitting one and only one CCB to be responsible for all configuration requests (and, in turn, failure management and resource management) will greatly simplify the implementation of the different embodiments of the present invention. Each controller 518, 522 essentially includes an identical copy of the system-wide configuration for the VCG 524 and SAN 500, which includes, among other things, the target/interface mappings for all the different interfaces within the VCG 524. According to certain embodiments of the present invention with a redundant controller configuration, such as in FIG. 5, a controller's 518, 522 stored configuration information will, therefore, include definitions for one or more interfaces which it does not own; these configuration definitions are simply ignored during operation of that controller 518, 522.

By providing the system-wide configuration on each controller 518, 522, the role of master controller can be freely moved from controller to controller in the VCG 524 (as long as only one master controller exists at a time) because each controller 518, 522 already has the entire configuration for the SAN 500. When the master controller (518 or 522) needs to implement configuration changes, these changes are simply propagated from the master controller (518 or 522) to all the other controllers (518 or 522) which can conveniently be labeled "slave" controllers although they operate essentially as peers. Embodiments of the present invention include an election process, described in detail later, whereby the controllers 518, 522 ensure that only one controller is operating as the master controller.

The VCG 524 relies on an administrative network 520 being provided to which every controller 518, 522 in the VCG 524 can attach. Although many possible network technologies can be utilized for the administrative network 520, the specific, exemplary environment of an Ethernet network using TCP/IP will be described to allow for the inclusion of concrete examples to help with the understanding of the aspects of the present invention; accordingly, the inclusion of this specific network technology is not intended to limit the various embodiments of the present invention to only this type of networking technology. In a preferred embodiment, all the first and second controllers 518, 522 are located on the same IP subnet so as to simplify routing tables, simplify routing decisions, and to allow Address Resolution Protocol (ARP) requests.

In addition to the network connection 520, the controllers 518, 522 are coupled to disk arrangement 534 and plural servers 502–508. From the perspective of the back-end, all physical devices 536 on the back-end interfaces of one controller are also visible to all other controllers in the VCG 524. This can be accomplished, in a two controller arrangement, by one controller 518 connecting 530 to Port A and one controller 522 connecting 532 to Port B which are available on typical fibre channel disk drives 536. If more than two controllers are included in the VCG 524, then an appropriate cross-connected switching arrangement can be used. From the perspective of the front-end, each controller 518, 522 within a VCG needs to be able to contact all other controllers in the VCG through the front-end channels 526, 528 and all the front-end channels 526, 528 are capable of seeing an identical set of servers 502–508. This latter characteristic can be accomplished using, redundant cross-connected switches 510, 512 as shown in FIG. 5 or through dual independent arbitrated loops (not shown) connected to each controller 518, 522 in the VCG 524.

The first and second controllers 518, 522 in the VCG 524 have at least three different communication channels for communicating with each other. First, there is the Ethernet network 520. This is the primary channel and is used for communication between controllers 518, 522 and also for communication with a workstation (not shown) from which a user can perform system configuration. The master controller (518 or 522) in the VCG 524 must have a functioning Ethernet connection because a user interfaces with the VCG 524 using that connection. The other slave controllers within the VCG 524 are not necessarily required to have a functioning Ethernet connection to remain members of the VCG 524. To provide an Ethernet connection, the CCB 202 includes a TCP/IP protocol stack having an IP address (e.g., 10.10.10.1) that connects with an Ethernet hardware interface.

The second communication channel is the front-end fibre channel network. As suggested earlier, conventional SAN controllers already include some type of functionality (e.g., a data link manager (DLM) 316) for testing fibre channel connectivity and "end-to-end" testing of the controller 518, 522 as it operates. Embodiments of the present invention, however, also use this channel, or DLM 316, as a back-up channel for inter-controller communications. Loss of this channel 316 is sufficient cause to remove a controller from the VCG 524. One exemplary method of implementing this alternative communication channel 316 is to utilize as much of the TCP/IP protocol stack 320 as possible. As a result, an application executing on the CCB 202 that generates, sends and/or receives messages only needs to know how to interface with the TCP/IP stack 320. Therefore, a shim driver 324 is used that is assigned a different TCP/IP address (e.g., 10.10.10.2). When sending a message from the controller 518, 522 the message is generated and presented to the TCP/IP stack 320 but references the second IP address, the operation of the TCP/IP stack 320 results in the message being presented to the shim driver 314 and the shim driver 314 functions to translate the TCP/IP packet into a message for the DLM 316 to send. When the controller 518, 522 receives a message at the DLM 316, the message is presented to the shim driver 314 and then sent up the TCP/IP stack 320 to a receiving application. As each controller 518, 522 has more than one front-end interface, this second communication channel, itself, includes redundancy in that there is more than one communication data link or data path available for inter-processor communications.

The third communication channel is a "reserved area" (not shown) on the physical disk drives 536 that each controller 518, 522 can write information to and read information from. This information, for example, can include configuration information, system logs, controller status, etc. The reserved area provides a low bandwidth method of communication between controllers that have lost both front-end and Ethernet connectivity. Because there are plural disk drives 536, this third communication channel, itself, actually provides many separate, redundant paths or links over which the controllers 518, 522 can communicate.

The SAN 500, and other embodiments of the present invention, are not necessarily limited to only these three communication channels just described. If more communications redundancy is desired between controllers 518, 522, then other and/or additional channels might be utilized. For example, additional IP links could be included or automatically generated and parsed e-mail messages might be used. Almost any type of communications link or path can be used that does not overly impact disk I/O performance in the SAN 500 but still provides sufficient speed and bandwidth to be useful for inter-processor communication.

The SAN 500 depicted in FIG. 5 shows only two controllers 518, 522 being included in the VCG 524. As indicated earlier, there can be more than two controllers in a VCG. The loosely-coupled nature employed in embodiments of the present invention allows additional controllers to be added merely by providing connections to the servers 502–508, to the network 520, and to the storage arrangement 534. In practice, n controllers can be arranged in a fault-tolerant manner nearly as easily as two controllers so arranged.

Returning to FIG. 4, a user configures the SAN 500 and the VCG 524 in step 404. The user interface, which is accessed by a user to perform configuration for a SAN 500, is augmented to include options for creating a virtual controller group (VCG) 524 that comprises plural physical controllers 518, 522. Conventional user interfaces were tied to only a single controller and showed the available disk drives, available front-end and back-end HBAs, and servers. Using a drop-down menu or similar functionality a user was able to specify how a virtual disk was configured. According to embodiments of the present invention, the configuration interface now includes an option to identify which ones of the multiple available controllers 518, 522 are to be grouped together into the VCG 524. The self-discovery feature permitted by the fibre channel protocol allows the controllers 518, 522 that have been grouped into the VCG 524 to recognize they are connected together through their front-ends.

Initially, the user will arbitrarily connect to one of the controllers 518, 522 to begin the configuration process. During the configuration process, the user will be presented with a list of identified controllers available for inclusion in the VCG 524. The user can then define a VCG 524 by indicating which controllers 518, 522 are to be part of the group. Each of the first and second controllers 518, 522 maintains the typical SAN configuration information about SAN 500 that is conventionally maintained by a storage controller; however, in addition, the first and second controllers further store an indication that a VCG 524 exists and also the identities and parameters of its member controllers (e.g., controllers 518, 522). In certain embodiments, this information includes IP addresses for each controller, the WWN for the controller, or explicit back-up controller information.

Next, in step 406, the user continues with configuring the SAN 500 by creating virtual disks for particular servers and assigning them to the interfaces available on the controller. However, the interfaces the user has available for assigning virtual disks to are not limited to residing on only a single controller but include all of the interfaces from all of the controllers 518, 522 in the VCG 524.

One variation to the above-described steps is when another controller is added to an existing SAN 500 within an existing VCG 524. In this instance, the user connects to the master controller from the group of controllers 518, 522 which is the master controller and uses the configuration routine's interface to modify the stored VCG definition by adding the new controller to the existing VCG 524. With the new controller and its interfaces now available, the user can redistribute virtual disks among all the interfaces if desired. Most conventional SAN configuration interfaces provide functionality to edit the assignment of virtual disks to particular interfaces; however, now the available interfaces to which virtual disks can be assigned are not limited to a single physical controller, but include all of the interfaces on the separate controllers 518, 522 acting as a VCG 524.

As described earlier, servers (e.g. 502–508) access disks by utilizing target identifiers that are based on WWNs related to a hardware identifier of a controller that owns the target. Each controller in a virtual controller group (e.g., 524) has its own unique hardware identifier; however, using this hardware identifier to form the target identifier would be confusing to the accessing servers since the target identifier would need to change in the event that the target is moved from one controller to another controller in response to some type of failure.

Embodiments of the present invention use a system serial number that is unique to a VCG, rather than a controller serial number that is unique to a controller, to form the target identifiers. As controllers are added to a VCG, the system serial number, which is written into each new controller's NVRAM, to be later used in any operation that would have used the controller serial number.

In step 408, the new or revised configuration information regarding the SAN 500 is propagated to all controllers 518, 522 within the VCG 524. The Ethernet network 520 is the preferred method to share the configuration information, although both the DLM 316 and the communication channels of the reserved area can be utilized as well. Each controller 518, 522 therefore maintains the new SAN configuration for the entire VCG 524. Some of that SAN configuration information is not used in the operation of an individual controller because the configuration information involves interfaces physically residing on other controllers. However, by using a common configuration among all controllers in a VCG, there is no need to track all possible variations and versions appropriate for each controller and each controller is ready, if needed, to assume the role of master controller without the need to add anything to its SAN configuration information. Once the SAN configuration information is received by all controllers 518, 522, each controller can perform a reset so that the new configuration information guides its behavior and to ensure that the servers 502–508 are notified as to which interface provides access to which targets.

The controllers 518, 522 will operate normally most of the time as shown in step 410. This operation will be in accordance with the SAN configuration information and service disk access requests from the various servers 502–508 to the storage arrangement 534.

During normal operations, the controllers 518, 522 in the VCG 524 will also monitor, in step 412, the health of their own internal components such as the front-end processor, the back-end processor, the CCB processor and routines, and the PCI links between the different processors.

When a fault or failure is detected by a controller 518, 522, in step 414, the failure manager routine 302 on the CCB 202 on the detecting controller (518 or 522) is sent a message so that the fault can be handled. While each controller 518, 522 has the same failure manager routine 302, the respective behaviors of these routines depend on whether the controller 518, 522 is a slave controller or the master controller. In the case of a slave controller, the slave failure manager behaves more like a message pipeline and simply passes the failure indication to the failure manager on the master controller. The master failure manager then handles any failure according to predetermined rules. Typically, a failure in one of the controllers 518, 522 will result in an election or re-allocating SAN resources.

In step 416, the master failure manager, or in some instances a slave failure manager, may call for an election. The election process determines which controllers 518, 522 in the VCG 524 are still available for operation and, of these controllers 518, 522, which is going to be master controller.

In step 418, the resource manager 308 on the master controller (518 or 522) is executed in order to re-allocate SAN resources and modify the SAN configuration information accordingly. While each controller 518, 522 in the VCG 524 includes a resource manager routine 308, this routine is only permitted to run on the master controller (518 or 522) in response to messages from the master failure manager 302. The resource manager 308 runs in response to an election process (step 416) that results in discovery of either unavailable controllers or a new master controller, and in response to a fault or failure message (step 414) that requires re-allocating SAN resources. A failed interface or a failed controller are examples of faults that will make the master failure manager send a message to the resource manager to make a change that will require re-allocating SAN resources.

As a result of the unavailability of an interface or a controller (i.e., a set of interfaces), the resource manager 308 will need to redistribute the virtual disks assigned to those failed interfaces to other interfaces still available within the VCG 524. The SAN configuration information stored on each controller 518, 522 provides enough information to decide what resources must be re-mapped and what possible destination can they be mapped to. This redistribution of virtual disks is accomplished by changing the mapping regarding which interface owns a particular target. Once this mapping relationship is changed, the other relationships involving such parameters as virtual disks, LUNs, servers, virtual RAID devices, and physical disk drives do not need any modification as they remain the same even though the target is now owned by a different interface (possibly on a different controller).

The rules, or criteria, implemented by the resource manager 308, the means for determining which available interface to receive redistributed targets, can be complex or simple but, regardless, result in the targets on a failed interface being re-mapped to a different interface or different controller. FIG. 5 does not explicitly label each interface on a controller 515, 522; however, these interfaces are similar in construction and operation to the interfaces 220a–220c shown in FIG. 2 depicting an exemplary controller 201. One possibility is that when a user first defines the VCG 524 using the configuration interface, the user is required to explicitly identify and assign a back-up interface for each interface. This explicit selection of a back-up interface could also require selection of a tertiary interface if another level of safety was desired. Also, because the back-up interface also has its own back-up interface explicitly identified, the targets on the failed interface could merely cascade through all the back-up interfaces until an available one is found. Back-up interfaces could also be defined based on controller-to-controller back-up without specifying a specific interface relationship. In this arrangement, when an interface fails its targets are redistributed to the first available interface on the specified back-up controller.

The resource manager 308 rules can also be established to require that targets of a failed interface are first moved to another interface on the same controller and only if all of those interfaces are unavailable on that controller will the targets be moved to another controller 518, 522. These rules could also include logical groups such that redistribution of targets first considers whether the interfaces are on the same controller; if not, are the controllers housed in a single computer chassis; if not, are the controllers housed in different chassis that are in the same building; if not, which back-up interface is geographically closer, etc. Alternatively, moving targets to interfaces which are not near the failed interface is a way to ensure that a single catastrophic failure (e.g., flood, fire, earthquake) does not also cause a failure of the preferred back-up interface.

The rules can also rely on the load already on the other interfaces to decide where best to redistribute targets of a failed interface. SAN controllers conventionally include some type of statistic gathering function that monitors I/O traffic and determines such parameters as Megabytes transferred per second. Other measures of load could be more qualitative and merely reflect how many targets are currently assigned to an interface. Using any of these measure of load, the resource manager's 308 rules can redistribute the targets to interfaces with the goal of more evenly distributing the load among all the interfaces in the VCG 524.

Once the new SAN configuration is generated by the resource manager 308, then it is implemented just as if it was created using the user interface. The same control routines that allow the user to manually provision and re-allocate SAN resources are used to respond to a failure within the VCG 524. However, these routines are automatically initiated by the resource manager 308 instead of manual user interaction.

The new configuration is passed, in step 408, from the master controller (518 or 522) to all the remaining controllers in the VCG 524 to control operation of the SAN 500 according to the new configuration.

Redundant User Interfaces for SAN Configuration

Each of the controllers 518, 522 in the VCG 524 include the web server 310 which provides the interface for the user to modify the configuration of the SAN 500. Only the master controller (518 or 522), however, is allowed to modify the SAN configuration information as it is a copy of the configuration information from the master controller's NVRAM that is propagated to all the slave controllers when they must update their SAN configuration information. If slave controllers were allowed to be independently changed, then different versions of configuration information would exist among the controllers 518, 522 within a VCG 524. To ensure that the user is directed to the master controller (518 or 522) without the user being required to explicitly investigate which controller happens to be the current master controller, the master controller (518 or 522) is assigned a unique IP address on the administrative network 520. This IP address is always associated with the master controller (518 or 522) regardless of which controller is fulfilling that role. As a result, the user's workstation is configured to connect to this unique IP address so that when it looks for the configuration web server 310, it is always directed to the master controller (518 or 522).

The TCP/IP stack 320 of the controller 518, 522 has the conventional capability of being able to support multi-homing. Thus, any controller 518, 522 can have its Ethernet network interface (not shown) configured to respond not only to the IP addresses earlier assigned but also respond to the "special" master controller IP address. Such a configuration is usually accomplished by changing a network table entry in the controller 518, 522 and re-initializing the TCP/IP stack 320 to read the new table.

Typically, a master controller (518 or 522) discovers that it can no longer serve as a master controller as part of an election process, which includes a new SAN configuration being determined and implemented among all the controllers 518, 522. Accordingly, when a controller resets with a new configuration, it always checks its network setup to see if it is configured to respond to the "special" master controller IP address. If a slave controller determines it is set to respond to the master IP address, then it removes that entry from its network interface configuration; if the master controller (518 or 522) determines it will not respond to the master IP address, then it adds that address to its network interface configuration. This "special" master controller IP address is part of the VCG configuration information that can be stored in the reserved area maintained by channel manager 306 that is accessible by all controllers 518, 522.

One benefit of this arrangement of the user configuration interface being a part of the web server 310 on every controller 518, 522 is that redundant copies of the SAN configuration routines exist and can be utilized without requiring the user to keep track of any changes within a VCG 524. Accordingly, in case of a failure of the master controller (518 or 522), the new master controller (518 or 522) has its own copy of the configuration application that can be interfaced with by the user without the user knowing that the physical identity of the master controller (518 or 522) has changed.

The interface 310 is not necessarily limited to being a web server. Equivalent functionality can be implemented in other embodiments using, for example, TELNET or a customized client/server software application.

Single Controller Implementation

Figure 6:
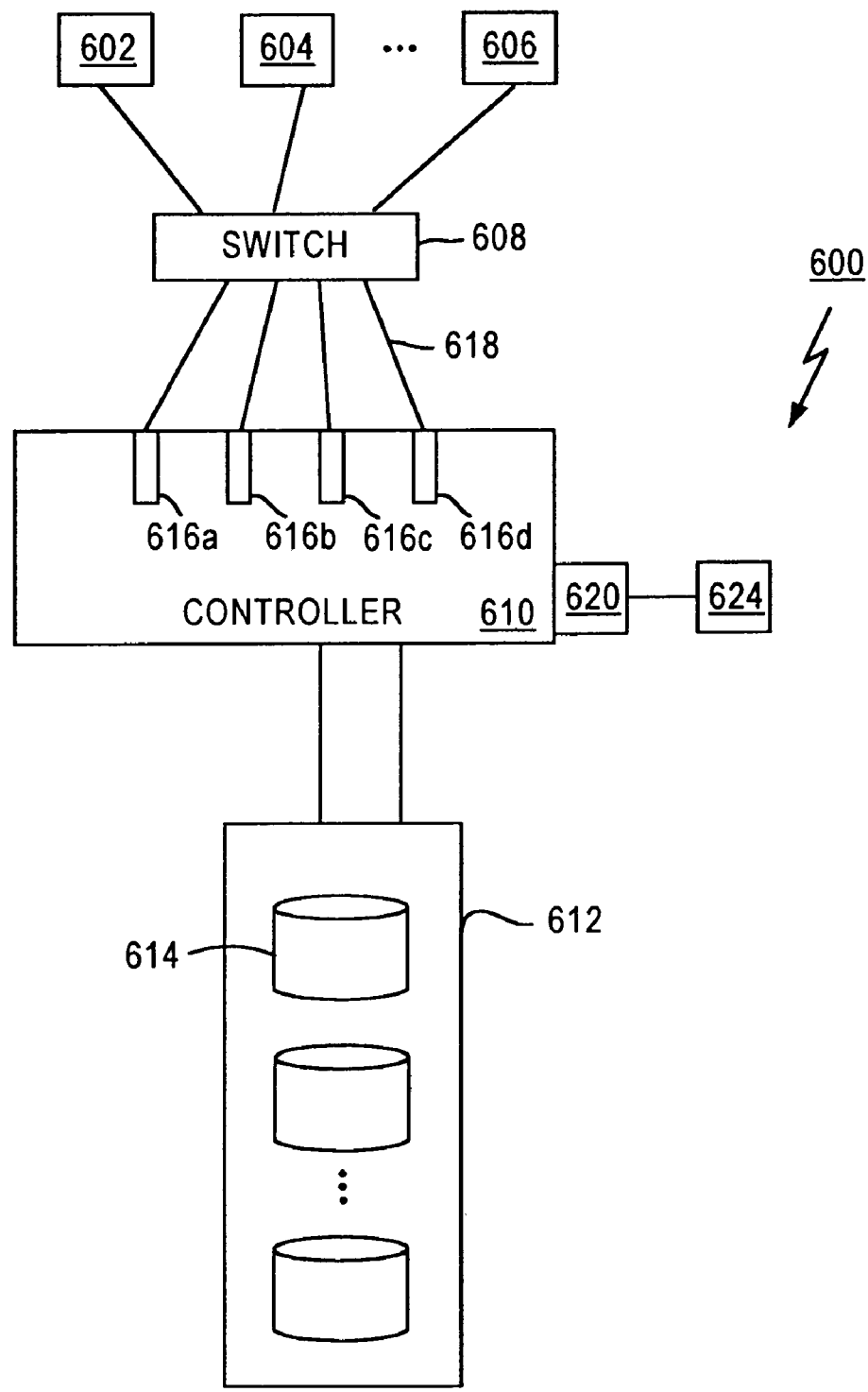
FIG. 6 illustrates an exemplary single controller able to move interface attached target in accordance with an embodiment of the present invention.

FIG. 6 illustrates an embodiment of the present invention that does not utilize plural controllers. In this embodiment, one controller 610 has plural interfaces 616a–616d. The controller 610 is substantially similar in to the controller 201 described in relation to FIGS. 2 and 3. Each of these interfaces are connected through respective fibre channel media 618 to switch 608 which is connected to plural servers 602–606. According to this arrangement, any sever 602–606 has a potential path to any interface 616a–616d. On the back-end, the controller 610 connects to storage assembly 612 comprising plural physical disk drives 614. The controller 610 also includes interface 620 that allows a user on workstation 624 to configure the SAN 600. Briefly, the user configures which virtual disks are assigned to which servers and provisions the parameters of these disks such as their RAID levels and which interface owns which virtual disk. The controller 610 converts this configuration into tables of relationships that are used to allow a server's access request to be satisfied by the appropriate physical disks 614 in the SAN 600.

A resource manager 308 running on controller 610 can operate even without other plural controllers 610 being present. In the event that the controller 610 detects a failure of one of the interfaces 616a–616d, then the resource manager 308 is notified of this failure. The resource manager 308 then determines what targets were owned by the failed interface and reassigns those targets to one of the remaining interfaces 616a–616d. Modifying only the interface/target relationship table will be sufficient to have that target become available using one of the remaining interfaces. There is no need to modify any of the relationship tables involving LUNs, servers, virtual disks, RAID devices, or virtual disks. Once the targets are moved to a new interface, that interface can be reset to allow the new configuration to become active and to inform the servers 602–606 of the new path to reach the moved targets.

Complex SAN

Figure 7:
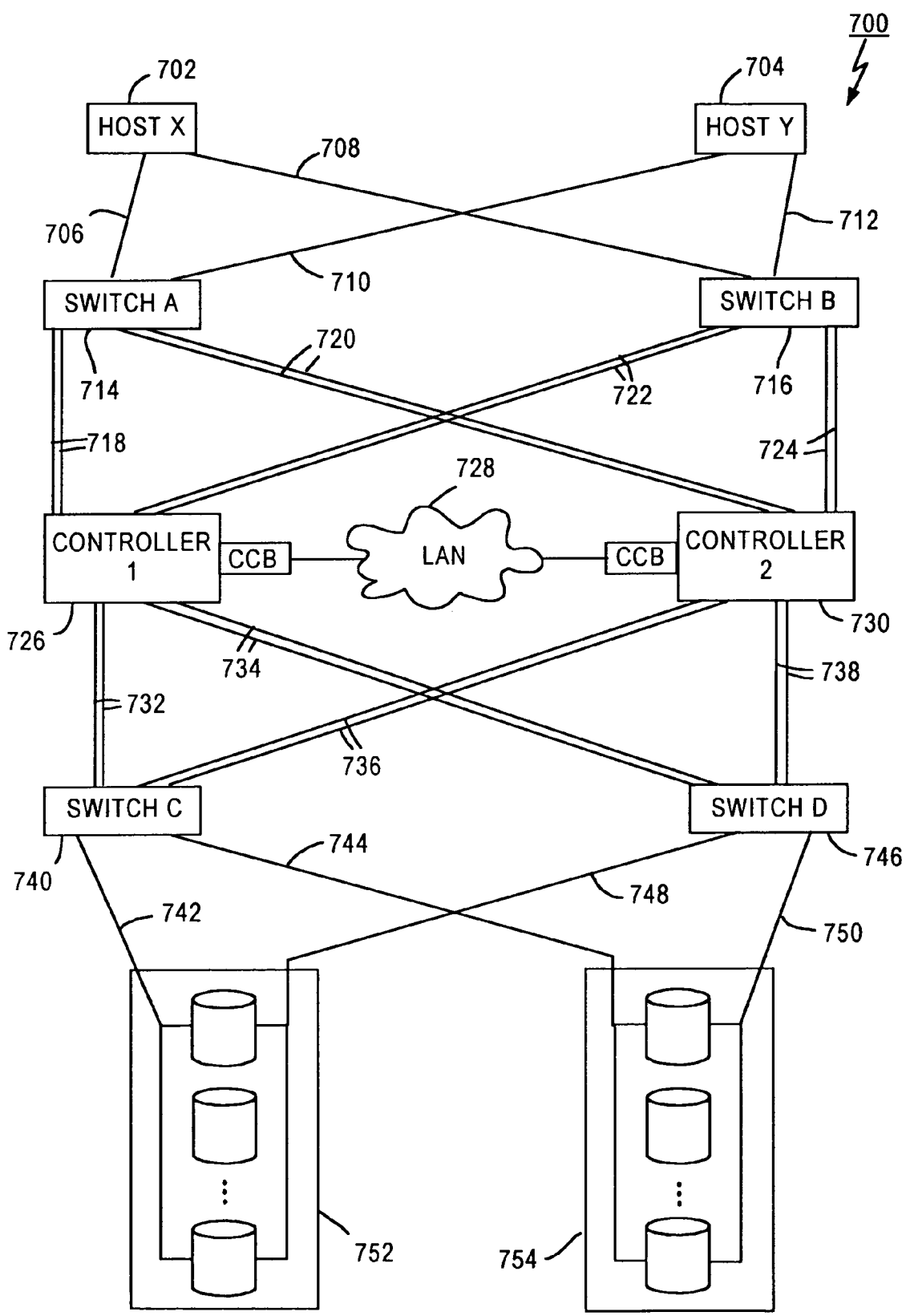
FIG. 7 illustrates an exemplary SAN that includes redundant front-end connections, redundant controllers, and redundant back-end connections in accordance with an embodiment of the present invention.

The SAN 500 in FIG. 5 illustrates an embodiment of plural controllers being grouped to form a virtual controller group 524. The SAN 700 of FIG. 7 is similar in that respect but illustrates an embodiment that includes plural data paths between the SAN components. In this SAN environment 700, the controllers, the switches and the data paths are redundant to provide an assurance of high data availability. Most aspects of this SAN 700 are not described in great detail as its operation is similar to that of SAN 500. IN FIG. 7, the third and fourth controllers 726, 730 are similar in construction and operation to the exemplary controller 201 described in relation to FIGS. 2 and 3.

Each server, or host, 702, 704 is connected to both fibre channel switches 714, 716 through respective links 706–712. However, the respective links 718 and 720 between switch A 714 and the third and fourth controllers 726, 730 are dual links to provide redundant paths between the switch A 714 and each controller 726, 730. Similar dual links 722, 724 are provided between switch B 716 and the controllers 726, 730. The third and fourth controllers 726, 730, similar to the previously described SAN 500, are connected to a network 728 to provide control and configuration interfaces. As discussed earlier, these front-end links 718–724 provide a redundant communication channel for intercontroller communications.

The back-end of the controllers 726, 730 have respective pairs of dual links 732, 734, 736 and 738 to each of the back-end switches 740 and 746. These links provide redundant paths to each switch 740, 746 from each controller 726, 730. Switch C 740 is connected via link 742 to a first disk cabinet 752 and via link 744 to a second disk cabinet 754. Switch D 746 is connected via link 748 to the disk cabinet 752 and via link 750 to the disk cabinet 754.

Within the SAN 700, the user is given the opportunity while configuring the VCG to explicitly indicate back-up interfaces. For example, if an interface on controller 726 connected to one of the links 718 were to fail, the most likely interface to move targets to would be the other interface on controller 726 that connects to the other one of links 718. The user is not required to configure the interfaces in this way, the resource manager 308 of the VCG can be relied on to dynamically pick the replacement interface; however, the user is provided the opportunity for explicit control if desired.

Cache Mirroring

One common way to improve write performance to the physical disk drives is to cache write requests in a cache memory on the front-end and then perform the writes during opportune periods. In a single controller environment, the front end cache is often mirrored to an area in the back-end's memory in order to provide some data security in case of a cache memory failure on the front-end. In operation, when a cache entry is entered in the cache, this entry is also entered in the mirror typically by a routine called a cache manager 326. However, if a more serious fault than a cache error occurs within the controller, then neither the cache nor its mirror may be available. With plural controllers available, embodiments of the present invention distribute these cache mirrors to other controllers to further improve the data availability.

Figure 8A:
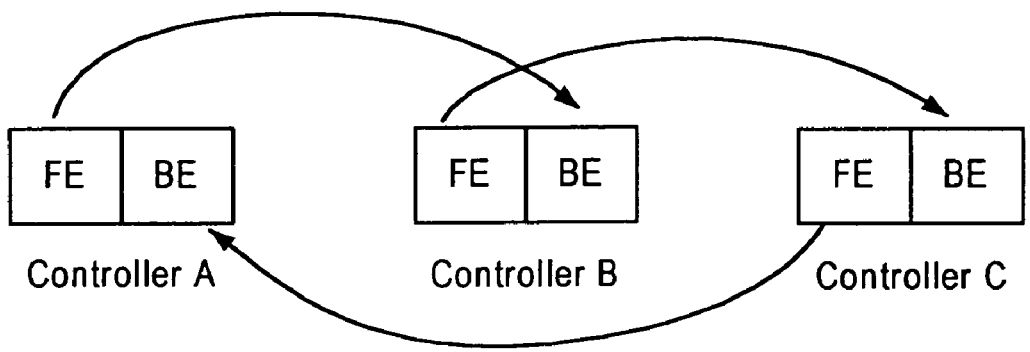
FIGS. 8A–8C illustrate an exemplary scheme for cache mirroring in accordance with an embodiment of the present invention.
Figure 8B:
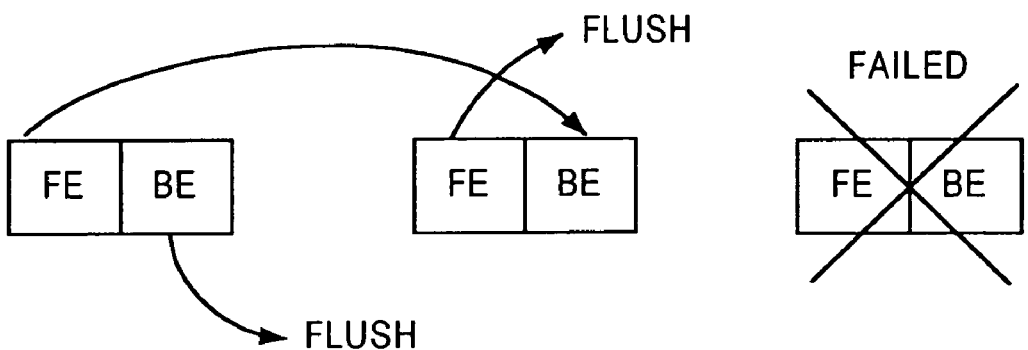
Figure 8C:
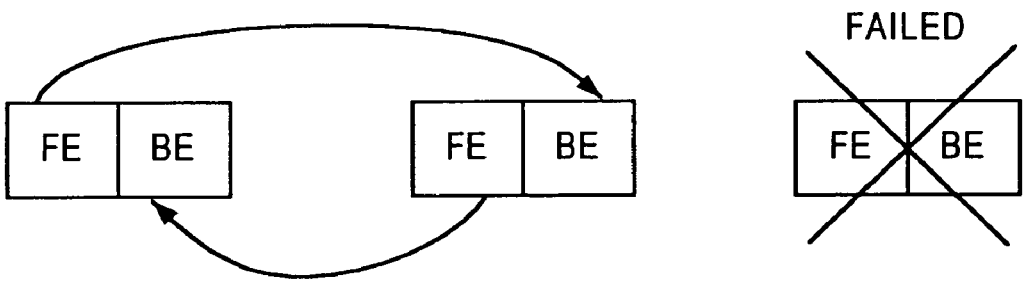

FIGS. 8A–8C depict the sequence of how cache mirroring can be implemented according to embodiments of the present invention. The cache manager 326 of the master controller within a VCG is responsible for ensuring the cache managers 326 of the slave controllers are given information regarding their respective cache "pairings". In FIG. 8A, the front-end cache of controller A is mirrored (as depicted by the arrow) in the back-end of controller B. The front-end cache of controller B is mirrored in the back-end of controller C, and the front-end cache of controller C is mirrored in the back-end of controller A. FIG. 8B depicts the state when controller C fails and is no longer a member of the VCG. The back-end mirror in controller A is flushed in order to write all the unfinished cache entries from the front-end of controller C onto physical disk drives. Similarly, the front-end cache of controller B is flushed as well because controller C is no longer available to be a mirror. FIG. 8C depicts the end result as the VCG reconfigures cache/mirror partners to include only those controllers which remain in the VCG.

This cache mirroring arrangement can be implemented regardless of the number of controllers within a VCG.

Inter-Processor Communications

Inter-processor communications (IPC) 312 includes functionality that different applications and routines executing on a controller 201 can use to communicate with another controller 201 in a VCG. For example, the IPC 312 can include a routine, or function call, to send a packet to another controller 201. This routine, or function, is designed to try the Ethernet channel 520 first and if it "times out", to try all the links in the DLM channel 316 and if those "time out", then to use the message passing area of the "reserved area" (not shown) as needed. As a result, each application running on a controller 201 does not need to be designed to independently try all the possible communications paths, they merely need to be designed to call the IPC 312. Also, subsequent requests to send packets can rely on the previous results, which the IPC remembers, to avoid wasting efforts on failed communication channels.

Packets between controllers 201 can, in some embodiments of the present invention, include authentication and verification techniques to prevent intentional and unintentional errors. Using conventional techniques, messages between controllers 201 can be signed (e.g., MD5) so that only authenticated messages are relied upon. The reserved area (not shown) is a preferred, secure area in which to exchange the keys that are needed by the controllers 201 to perform signature and authentication routines.

As only one master controller is allowed within a VCG and it is this master controller that is exclusively allowed to configure the storage space owned by the VCG, there are certain commands that slave controllers are not allowed to perform themselves but instead must request from the master controller. Additionally, there are health monitoring commands and messages that controllers can exchange to help identify when a controller 201 has had a fault or failure. Below are some exemplary packets that can be exchanged between controllers.

Configuration Update—SAN configuration information involves changes to, for example, the different mapping tables involving LUNs, virtual disks, target, interfaces as well as the creation or deletion of a virtual disk and/or RAID devices. These changes can result from fail-over operation initiated by the resource manager 308 or from user interaction with the configuration interface. The SAN configuration should be updated on all the controllers in a VCG as simultaneously as possible.

The resource manager 308 uses this packet to inform the slave controllers that a new SAN configuration has been generated and stored in the configuration area of the reserved area (see description of FIG. 11, infra). In response to receiving this message, each slave controller reads the new configuration information into its NVRAM and resets its interfaces to use the new SAN configuration. One alternative to the command to reset interfaces can be a separate message sent by the master controller, which is sent a predetermined period of time after the configuration update message is sent, so that the reconfiguration process on each controller appears to be a two-step synchronized process.

One specific example embodiment involves the following steps:

a) master controller informs all slave controllers to stop I/O operation (this can force flushing of any caches);

b) wait for acknowledgment for all controllers;

c) make the configuration change in the master controller NVRAM;

d) write the NVRAM to the reserved area e) master controller sends Configuration Update packet to all slave controllers in the VCG (in response to receiving this packet, the slave controllers read the information from the reserved area into their NVRAMs);

f) wait for acknowledgment from all controllers; and g) master controller send command to reset interfaces by telling them to restart I/O operations.

Request Spare Disk—The failure manager 302 on a slave controller can detect a physical disk failure that can be corrected by employing a hot spare. Instead of allowing every slave controller to provision hot spares when they detect such a failure, the slave controller requests that the master controller's resource manager 308 allocate a hot spare. The master controller receives from the slave controller an indication of the virtual RAID device affected and the physical disk ID that failed and behaves as if had discovered the need for a hot spare itself. The resource manager 308 then sends to all slave controllers in the VCG a message indicating the new physical disk ID of the hot spare. Each slave controller, and the master controller, is then responsible for moving any data they control, which is affected by the failure, to the hot spare as is typically done in the event of provisioning a hot spare in a single-controller SAN.

Election Packet—This packet can be sent out from any of the controllers to the other controllers in a VCG to call for an election. The election process ensures that one, and only one, controller in a VCG is configured as the master controller. In response, each controller returns information regarding its configuration such as the available interfaces and the respective targets. Other data can be returned as well such as its MAC address, whether it considers itself to be the master controller and how many other controllers it has successfully contacted within the VCG. This information is useful in determining which controller will be elected master. The information is cached on the receiving controller's CCB and if the controller is the master controller after completion of the election, then this information is maintained as a global resource list that the master controller revises as interfaces or controllers in the VCG fail.

Unlike heartbeat packets, described later, election packets are preferably sent to all controllers in a VCG rather than using the heartbeat tree arrangement.

Report Controller Failure—Each slave controller failure manager 302 should report to the master controller failure manager 302 an internal failure (if possible) without waiting to be polled by another controller. This message, or packet, can include a field to indicate whether the failure involved the slave's Ethernet link, the DLM link, the cache memory, the main memory, the NVRAM, or a fibre channel interface. These are exemplary types of failures only and the controller can detect a number of other failures that might also be reported to the master failure manager.

Acknowledgment Packet—In response to commands or requests, the routines on the slave and master controller can positively send acknowledgment packets to indicate receipt, or the status, of a command or request.

Heartbeat Packets—This packet is sent from one controller to another in a VCG to determine the health of the receiving controller. In the SAN configuration information stored by each controller in the VCG, there is a copy of the VCG controller table 900 depicted in FIG. 9A. This table consists of a number of entries 902, each of which corresponds to a controller in the VCG. However, heartbeat packets are sent between controllers using a binary tree structure 910 as shown in FIG. 9B. This tree 910 is constructed so that the master controller is the root node (i.e., 0) which has two children nodes (i.e., 1 and 2) corresponding to the first and second slave controllers in the table 900. Each of these nodes have two children nodes and the tree structure 910 can continue for as many slave controllers as are in table 900.

Every controller in the tree 910 that has children nodes periodically sends heartbeat packets to each of the controllers corresponding to its children nodes in tree structure 910. An exemplary period may be every 5 seconds or every 1 second. In response, a "child" controller responds with a packet that includes a) the number of children aggregated to it (i.e., the number of children nodes along more than one tree generation) and b) the status of each of these children. This status information for each child can include a) the child controller ID, b) the timestamp of its last heartbeat response, and c) statistics for that controller. The statistics for each controller can include such parameters as a) number of I/O requests per second of all interfaces, b) megabytes/second transferred for all interfaces and c) depth of data access request queue.

This schema for heartbeat packets results in the master controller receiving the status of all slave controllers immediately upon the first two slave controllers receiving a heartbeat packet. There is no need for the slave controllers to poll down their tree branches and then wait for all responses as each slave controller always has the status of all children. This status information can be used by the resource manager of the master controller when determining how to redistribute targets in the event of a controller failure.

Go Off-line—A controller may not necessarily be able to detect that it has failed while another controller connected to it may be able to detect the first controller's failure. Thus, the detecting controller can instruct the first controller to go off-line. In response to this message, the first controller can shut down as gracefully as possible. This message can also be received as the result of an election process to remove a controller that erroneously believes itself to be the master controller.

Log Event—The user of a SAN will be inconvenienced if they have to connect to every controller in a VCG to get separate log messages from each one of the controllers. A more user-friendly solution is to have the logger routine 314 of each slave controller locally store log events but also notify the master controller's logger 314 routine of any log events.

Ping Message—The level of detail included in response to a heartbeat message is not always needed. Therefore, a ping message can be sent between different controllers wherein the expected response is a simple "alive" acknowledgment. This message can be used to quickly test connectivity between controllers over a given channel.

Cache Mirror Assignment—As described earlier, the cache mirroring in a VCG provides redundancy among different controllers. The cache manager 326 of a slave controller sends this message to the master controller to request and receive cache mirror assignments. In response, the master controller identifies to the slave controller both a) who's cache it should be mirroring and b) who is mirroring its cache. This identification of the controllers could be accomplished using WWN numbers or simply the ordinal position of the controller in the table 900.

The above messages are provided to show specific examples of how the different routines and applications executing on the CCB can perform there functions. Other messages and packets are contemplated within the scope of the various alternative embodiments of the present invention. Also, each of the above-described messages are exemplary in nature in that such things as the specific data in a message or whether or not an acknowledgment is needed, can be varied, to include other alternatives not explicitly described, without departing from the scope of the present invention.

Failure Manager

External Devices

Monitoring the health of devices external to a controller 201 can be accomplished by either of two methods. First, the heartbeat messages described earlier can be passed between controllers 201. The heartbeat response (or lack of a response) will contain enough information to determine whether a controller 201 has suffered a severe failure. Secondly, the controller 201 may fail in such a way that it can inform the master failure manager 302 that it is going off-line. A controller 201 that goes off-line should place its interface cards 220a–220c, 222a–222c at reset and stop participating in elections and heartbeat trees.

A front-end interface 220a–220c of a controller 201 may fail in a manner that is not easily detected by that particular controller 201 but can easily be detected by another, connected controller. The DLM 316 of typical SAN controllers routinely send datagrams down each link to each target on that link to collect data about the link and, if a response to the datagram "times-out", the loss of a path is logged. Within embodiments of the present invention, this functionality of the DLM 316 is relied upon to indicate interface failures and to report such failures to the failure manager 302 (not just log them as before). Because the DLM 316 sends this datagram on its own, no additional heartbeat or monitoring logic is required at some other level to determine interface failures on remote controllers.

Internal Resources

Within a controller 201, the CCB 201, front-end 212 and back-end 208 processors participate in monitoring each other's health and the health of the links connecting them. For example, a processor (208 or 212) might detect a cache failure that is reported to the failure manager 302 and then to the resource manager 308 so that the controller 201 can possibly be removed from the cache mirroring arrangement maintained by the master controller 201.

One embodiment for monitoring processor health is through the use of a deadman timer. The timer can be implemented by placing a "shut-down" process on each of the front-end and back-end processors in a wait mode. Every time a ping message is received from the CCB, the processor responds to indicate its continued functioning and also resets the timer. If the timer fails to be reset (indicating that no ping message was received), then the shut-down process runs which results in reporting the failure (e.g., via a log message) and gracefully ending operations of the controller so that it is unresponsive as quickly as possible. Its inactivity will soon be detected by the other members of the VCG once it stops responding to heartbeat packets.

Failure Manager

On each controller 201 the failure manager 302 receives inputs from both the heartbeat routines and the internal health monitoring routines 318. Each failure manager 302 is preferably includes two portions—a slave failure manager and a master failure manager. In operation, the failure manager 302 executing on a slave controller 201 will utilize only the slave manager functions; however, on a master controller, both portions of the failure manager 302 will be utilized. Thus, any controller 201 has the capability of assuming the role of a slave controller or a master controller as needed by the VCG.

The failure manager 302 of a slave controller 201 is substantially passive and will pass failure reports on to the failure manager 302 on the master controller 201. On the master controller 201, a slave failure manager is also executing but instead of having to pass messages to a separate controller, it can merely pass the message internally to the master failure manager. The master failure manager 302 will evaluate the error message to determine what appropriate message to pass to the resource manager 308. In response to receiving a message from the master failure manager 302, the resource manager 308 will need to determine if redistribution of targets among interfaces or controllers is necessary and perform the appropriate reconfiguration of the SAN.

The table below provides a list of failures that can occur within a single controller (e.g., 201) and between the multiple controllers (i.e. controller1 and controller2) in the exemplary SAN environment 1000 of FIG. 10. The first and second controllers of FIG. 10 (i.e., controller1 and controller2) are substantially similar in construction and operation to the controller 201 described in relation to FIGS. 2 and 3. In this environment, the details of the storage 40, servers 30 and fibre channel links 7, 9 and 11 are not critical and therefore are only shown schematically. The details of first and second controllers (controller1 and controller2), however, are shown in enough detail to depict the three processors (1, 2, 3 and 4, 5, 6) on each controller, the respective links (12, 13, 14, 15, 16, 17) between these processors, and the Ethernet link 8. While it is sometimes beneficial to know precisely what part fails when a fault occurs, this specific information is not always necessary to determine how the fault should be corrected. For example, the failure managers 302 and resource manager 308 do not need to know what particular PCI bus error occurred on a controller; it is sufficient for the master failure manager 302 to "hard" fail that controller and then the resource manager 308 will redistribute the targets owned by its interfaces. Later, in-depth diagnostics or troubleshooting by a technician can pinpoint the exact error if necessary. In the meantime, the VCG is able to continue providing data access without interruption.

The first six entries in the table differ in that they are detected by internal error handling mechanisms within one of the first and second controllers (controller$_1$ or controller$_2$). Embodiments of the present invention advantageously take advantage of the master and slave failure managers 302 to report these internal error-handling messages to the master controller (one of either controller$_1$ or controller$_2$) so that the resource manager 308 can fail-over the affected controller. The remaining entries in the table indicate faults that can be detected by the heartbeat (internal and external) mechanism described herein, any such faults result in a slave or master failure manager 302 handling the problem. For that reason, the second column of the table differs in that for the first six entries the internal error handler is described and for the remaining entries, the identity of the controller which discovers the fault is provided.

Figure 10:
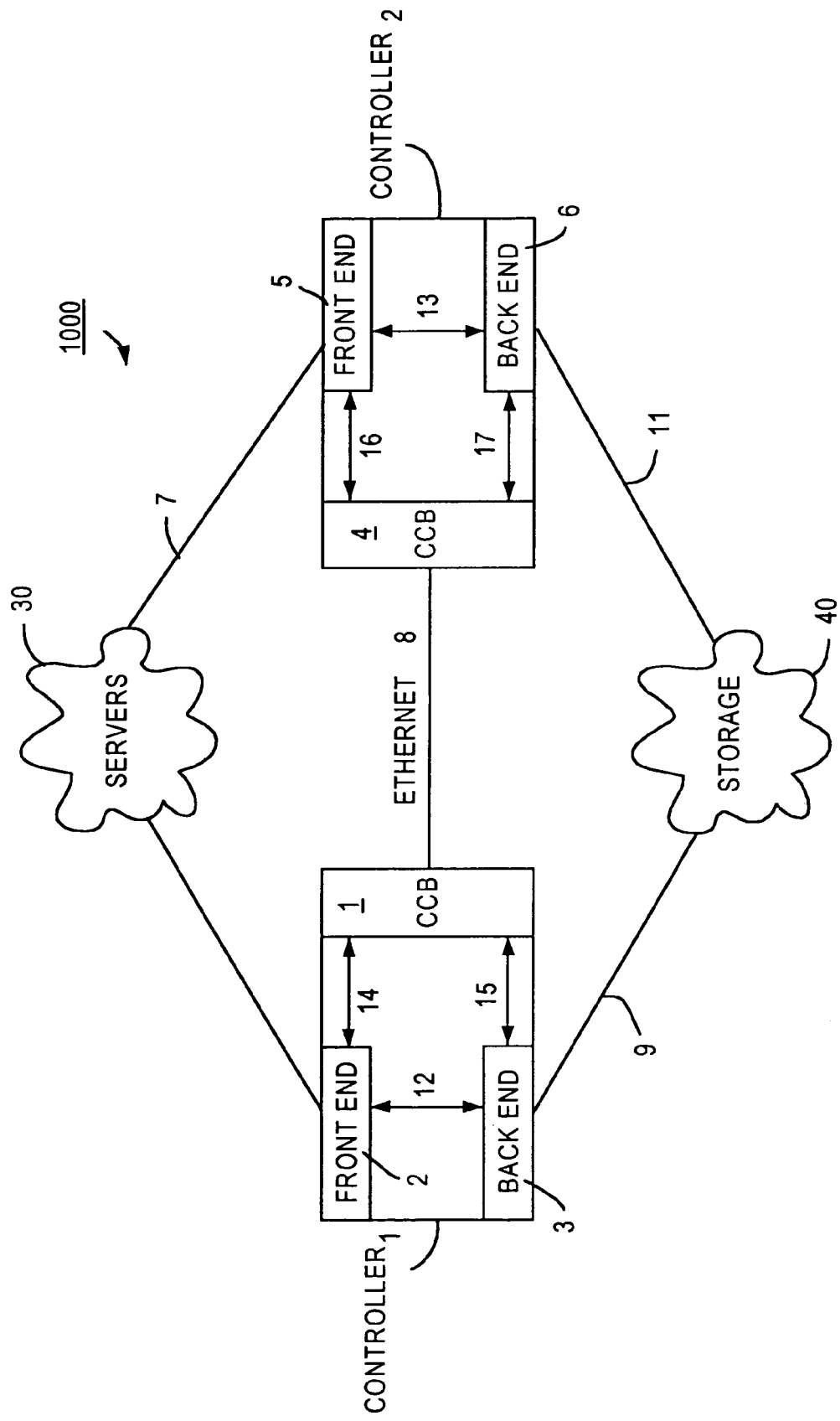
FIG. 10 illustrates a schematic view of the connections between controllers of a VCG in accordance with an embodiment of the present invention.

Each entry in the first column of the table refers to a particular data link (e.g., 2-14-1) in the environment 1000 of FIG. 10. The table then reveals the outcome of what happens if that data link were to fail. The third column indicates what a slave failure manager 302 does that discovers the data link error and then the last column indicates what the master failure manager 302 does to a controller based on the failure which is also reported to the resource manager 308.

ERROR DETAILS

| ERROR LOCATION | ERROR HANDLER | ACTION BY SLAVE FAILURE MANAGER | ACTION BY MASTER FAILURE MANAGER TO RESOURCE MANAGER |
|---|---|---|---|
| Any PCI bus failure or NVRAM failure | place controller in reset | report heartbeat failure to master | fail controller |
| front-end or back-end processor interrupt error | retry and if fail then reset | report heartbeat failure to master | fail controller |
| HBA firmware error or DLM error | retry and then change error to "no loop" | none | none |
| no loop detected or no HBA response | reset HBA and write failed state to NVRAM | slave failure manager report chip failure to master | fail interface |
| loop down | reinitialize | none | none |
| single bit error correction code error | internal handler fixes | none | none |
| DISCOVERED BY | | | |
| 2-14-1 | controller1 then controller2 | report heartbeat failure to master | fail controller |
| 3-14-1 | controller1 then controller2 | report heartbeat failure to master | fail controller |
| 4-8-1 | controller2 | start election | none [participates in election] |
| 1-14-2 | controller1 then controller2 | report heartbeat failure to master | fail controller |
| 3-12-2 | controller1 then controller2 | report heartbeat failure to master | fail controller |
| 5-7-2 | controller2 | start election | none |
| 1-15-3 | controller1 then controller2 | report heartbeat failure to master | fail controller |
| 2-12-3 | controller1 then controller2 | report heartbeat failure to master | fail controller |
| 6-(9 or 11)-3 | Don't Care | none | none |
| 40-9-3 | controller1 | request spare from master | provide hot spare if one drive, else fail controller |
| 1-8-4 | controller1 | start election | none |
| 5-16-4 | controller2 then controller1 | report heartbeat failure to master | fail controller |
| 6-17-4 | controller2 then controller1 | report heartbeat failure to master | fail controller |
| 2-7-5 | controller1 | start election | none |
| 4-16-5 | controller2 then controller1 | report heartbeat failure to master | fail controller |
| 6-13-5 | controller2 then controller1 | report heartbeat failure to master | fail controller |
| 3-(9 or 11)-6 | Don't Care | none | none |
| 4-17-6 | controller2 then controller1 | report heartbeat failure to master | fail controller |
| 5-13-6 | controller2 then controller1 | report heartbeat failure to master | fail controller |
| 40-1-6 | controller2 | request hot spare from master | provide hot spare if one drive, else fail controller |
| 3-9-40 | controller1 | request hot spare from master | provide hot spare if one drive, else fail controller |
| 6-11-40 | controller2 | request hot spare from master | provide hot spare if one drive, else fail controller |
| 2-7-30 | controller1 | report chip/loop failure to master | fail interface |
| 5-7-30 | controller1 | report chip/loop failure to master | fail interface |

The above table is provided to show how the slave and master failure managers 302 work together to determine what action is reported to the resource manager 308 so that redistribution of targets can take place if needed. It is not intended to provide an example of every possible error that might be detected within all embodiments of the present invention.

Reserved Area

One purpose of the reserved area is to store data regarding the configuration of the SAN, including security data. This information can also include master election logs and system event logs. Another purpose of the reserved area is to provide a back-up communication channel between controllers in case of the failure of the primary communication paths (e.g., Ethernet network 520 and DLM channel 316).

In certain embodiments, the disk storage used for the reserved area resides in the disk drives on the back-end of the SAN that are used to provide virtual storage. However, the reserved area could reside on any memory that is accessible to the back-end of each controller such as one or more specific disks, semiconductor memory, or the like. Furthermore, in certain embodiments, the reserved area is duplicated on every physical disk in the SAN back-end but in other embodiments might reside on only a subset of these disks. Through multiple, parallel write operations a master controller can ensure the information for the reserved area reaches all appropriate disks and when being read by a controller, sequential read operations can occur until a good copy is found.

FIG. 11 illustrates an exemplary arrangement of the reserved area 1100 on a disk. According to this embodiment, the reserved area 1100 on each disk is divided into the master area 1102, the logging area 1104 and the communications area 1106.

The master area 1102 can only be written by the master controller but includes information useful for all controllers to read. For example, this area 1102 can include, but is not limited to, the VCG serial number that provides a unique identification of the VCG, an election serial number that allow a controller to determine if they are participating in the latest election, the ID of the master controller of the VCG, the number of controllers in the VCG, the secure communications key, the IP address of the master controller, IP routing information for all controllers, licensing parameters and firmware updates for CCBs. The area 1102 can include local network settings for each controller in the VCG such as their MAC address, their IP address, the IP address of their shim driver, and their controller serial number.

The logging area 1104 is used by the master controller to record all the log event messages received from slave controllers.

The communications area 1106 has a separate section (e.g., 1110 and 1112) for each controller in the VCG. Each of these separate sections includes a receive area 1120 for receiving messages from the master controller, a transmit area 1122 for storing messages for the master controller to read, an election area 1124 that indicates the election state seen by the controller during an election, and a failure state area 1126 that allows the controller to receive an indication from another controller that it should enter a "failed" state.

The channel manager 306 on each controller provides the mechanism to transfer and receive packets through the reserved area's communication area 1106. This channel manager 306 is responsible for determining if any outbound messages are to be sent and if any inbound messages are ready for receipt. The channel manager 306 on the master controller is responsible for checking for these messages regarding all slave controllers while each slave controller's channel manager 306 is responsible only for its own messages.

Election

The election process has been mentioned above in reference to determining the master controller for the VCG, typically based on the occurrence of some type of failure. The elector 304 in conjunction with a failure manager 302 can initiate an election, for example, under the failure conditions in the detailed error table described above or, for example, when the master controller fails such that it can no longer be master controller. More generally, the election process can be initiated whenever a controller 201 determines that an apparently operational controller 201 can no longer be communicated with over any communications channel. The elector 304 on each controller then carries out the operation of the election process.

Figure 12:
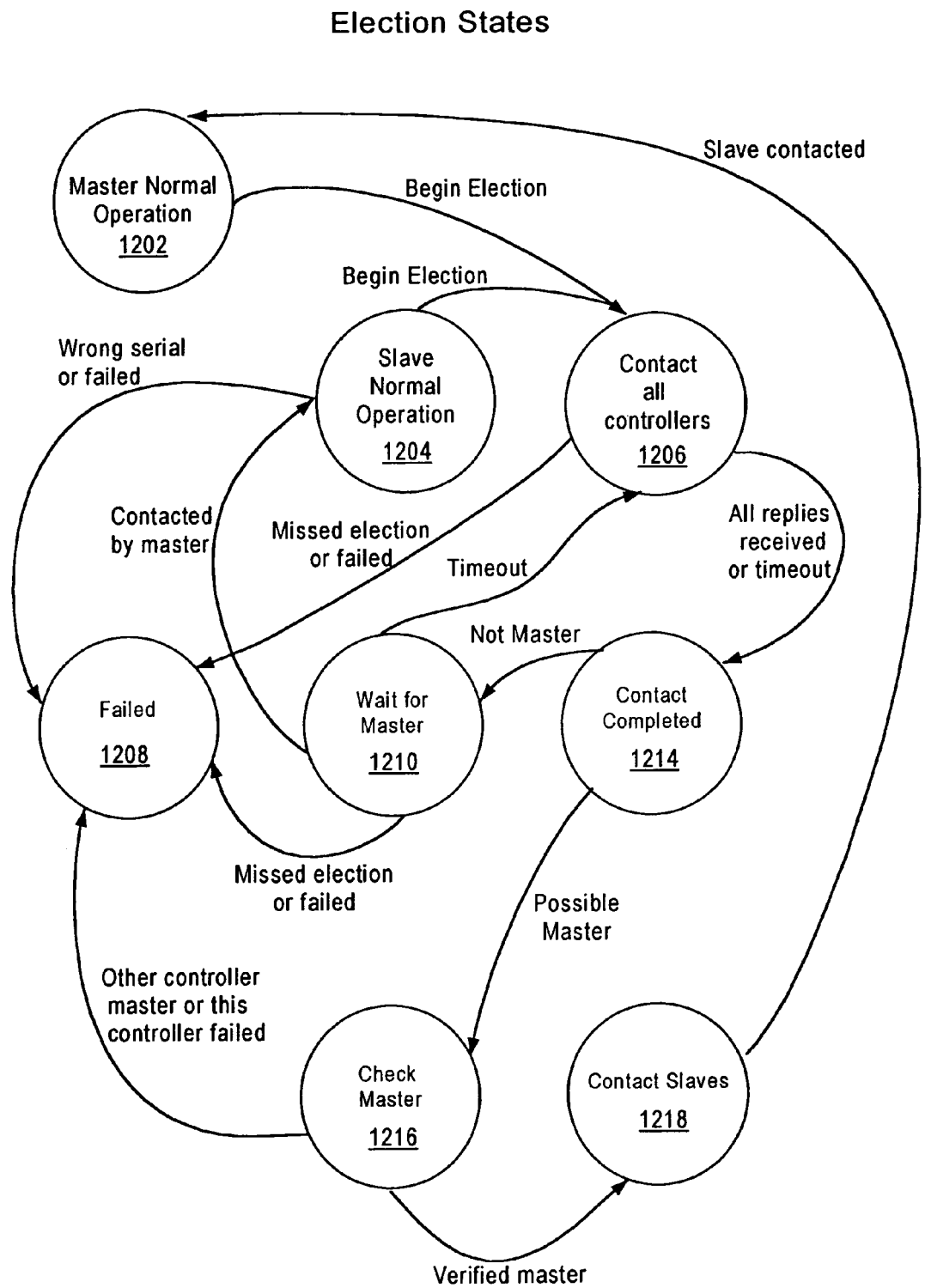
FIG. 12 depicts an exemplary state diagram of the master controller election process in accordance with an embodiment of the present invention.

FIG. 12 depicts a state diagram of the different states that occur during an election process. The election process of FIG. 12 is described below in relation to a SAN environment having plural controllers working together to provide virtual storage (such as that in FIGS. 5 and 7). However, this election process is not limited in its application to only this environment, but is beneficial in any environment that includes plural, cooperating devices that are connected by more than one data path and that must have one of the cooperating devices assume a role different than the other devices. One exemplary embodiment outside of the SAN environment is that of redundant Ethernet switches that provide redundant data paths between the two "sides" of the switches. Such switches are typically connected along a front-end management connection, in addition to the common Ethernet medium that they connect with. Accordingly, these switches can utilize the present election method as well to elect a primary, or master, switch.

The master controller in a VCG is typically running in normal operation mode 1202 and the slave controllers are typically running in normal operation mode 1204. Either one of these types of controllers can leave those normal operation states and call for an election. The call for an election causes the "calling" controller to contact, in state 1206, all the other controllers using the Election Packet described earlier. These attempts are made using the Ethernet (e.g., 520 of FIG. 5) or Fibre Channel communications channels (e.g., DLM 316) until success (or failure) is achieved. A controller can determine how to attempt to contact all the other controllers in a VCG using, for example, the information in the reserved area of FIG. 11. If the controller cannot access the reserved area, then it takes itself off-line to prevent itself from participating in the election.

When a controller receives an Election Packet it responds to the sending controller with information about itself and then exits its own normal operation state 1202 or 1204 to enter the contact all controllers state 1206. As a result, all the controllers that can be contacted enter the election process. Each controller waits in state 1206 until it receives a reply from all controllers or a predetermined time period (e.g., 10 seconds) has transpired.

A controller has two exits from state 1206, it can fail out of state 1206 by detecting some error that prevents it from participating in the VCG such as an internal error, a failed front-end, or if it cannot read or write to the reserved area 1100. The other exit from state 1206 occurs once all the replies are received or timed-out, so that a controller can enter state 1214. From state 1214, the controller either realizes it is not the master controller of the VCG and, thus enters state 1210, or it realizes it is possible that it is the master controller and enters state 1216. There are a number of reasons a controller can realize it is not the master from among a group of controllers. For example, the controller must have a functioning Ethernet link and the front-end fiber link to other controllers must be operational.

When the controller realizes it will be a slave controller, the controller enters state 1210 and waits until it is contacted by the master controller which will likely include information regarding a new SAN configuration as well. The controller in state 1210 also can time-out waiting for the master contact and, as a result, fail over to state 1208.

The controllers that enter step 1216 check to see who should be the master controller. The competing controllers share information to determine who can contact the most other controllers. Based on this information, the controller who can contact the most other controllers is determined to be the master and the other controllers are failed to state 1208. This explicit failure of the losing controller is to ensure that only one master controller exists and that the one with the most connections is elected and enters state 1218 to contact the slaves. It is possible that the different controllers coincidentally have the same number of connections; in this case their MAC addresses are compared to arbitrarily determine that the master controller will be the controller, for example, with the lowest MAC. As this hardware address is unique among devices, one controller will enter state 1218 and the other controllers will fail to state 1208.

In state 1218, the master controller then contacts the slave controllers to inform them of the election outcome. The master controller, in participating in the election and based on the reserved area information, is able to determine which controllers remain from the original VCG group and which controllers can no longer be reached. The elector 304 in conjunction with the master failure manager 302 then informs the resource manager 308 of the controllers that are no longer available and, therefore, need to have their targets redistributed. The resource manager 308 then initiates a configuration update of the SAN, propagates it to the remaining slave controllers who return to normal operation state 1204, and causes the master controller to return to normal operation state 1202.

The possibility exists that a network failure can split a VCG into two parts that cannot communicate via fibre channel nor Ethernet with each other. Both of these sections of the VCG, which can conveniently be referred to as orphan trees, will likely enter an election process without knowing of the other ongoing election process. Eventually one or more controllers in each orphan tree will probably reach the check master state 1216. In this state, when the competing controllers check the reserved area of FIG. 11 they may discover that other controllers (which cannot be contacted) in the VCG are performing their own election or have elected their own master. By exchanging messages and viewing configuration information via the reserved area of FIG. 11, the competing controllers from the different orphan trees can determine which controller has connections to the most controllers and, therefore, should be the master controller of the VCG. The losing controller(s) will fail to state 1208 in order not to corrupt the SAN configuration of the VCG. In addition, any slave controllers in the losing orphan tree are also inactivated so that only the surviving master controller and the slave controllers within its tree are available to manage the SAN.

The above detailed description provides a comprehensive explanation and description of many aspects of plural controllers loosely-coupled to provide n-way redundant controllers in a virtual storage SAN environment.

Master Controller Qualities and Responsibilities

Any controller in a VCG, whether master or slave, must be able to function as a storage controller with access to the servers and disks within the SAN. In addition, for a controller to be the master controller within a VCG, its Ethernet network link must be functional and its front-end fibre link connections to other controllers must be operating properly. In case of an election, for example, from a network failure that splits a VCG, the master controller is the controller which connects to more controllers via the Ethernet interface than any other controller. As a last resort, the master controller is the controller having the largest, or smallest, MAC address of all potential master controllers.

The master controller functions as a storage controller to service I/O requests to connected disks and servers. The master controller also controls the configuration by providing the master configuration console, or interface, for manipulating the VCG and its configuration. The master controller provides control for provisioning hot-spares for all controllers in the VCG and manages the redistribution of SAN resources following a failure. The master controller starts and monitors the heartbeat process to detect new failures within the VCG and is responsible for propagating and configuration changes to all controllers in the VCG. The master controller also is responsible for receiving log events and statistics from all the slave controllers and presenting these to a user.

Slave Controller Qualities and Responsibilities

A slave controller is required to have a functioning front-end fibre channel connection that can communicate with the next higher controller in the heartbeat tree.

The slave controller functions as a storage controller to service I/O requests to connected disks and servers. The slave controller also participates in the propagation of heartbeat messages and participates in the election for a new master controller. In addition, the slave controller sends log events and statistics to the master controller and reports local statistics when appropriate.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A storage area network comprising:
    a plurality of front-end interfaces, each respective front-end interface providing access, to one or more associated targets, to one of a plurality of connected servers;
    a resource management application configured to determine to which of the plurality of front-end interfaces to move any target associated with a first front-end interface;
    wherein the plurality of front-end interfaces are distributed across a plurality of storage controllers which are loosely-coupled to provide an arrangement including a master storage controller and one or more slave storage controllers
    the resource management application configured to execute on the master storage controller; and
    wherein the resource management application, in determining to which of the plurality of front-end interfaces to move any target associated with a first front-end interface, is configured to base the determination on at least one of: a controller identity of a particular storage controller with which the first front-end interface is associated, and a physical location of the particular storage controller.

2. The storage area network according to claim 1, further comprising:
    a table of relationships, each relationship in the table indicating a correlation between one of the plurality of front-end interfaces and a fail-over front-end interface from among the other front-end interfaces, and wherein the resource management application is configured so as to determine to move any target associated with the first front-end interface to the correlated fail-over front-end interface in accordance with the table of relationships.

3. The storage area network according to claim 1, further comprising:
a compilation of statistics regarding data transfers through each of the plurality of front-end interfaces, and
wherein the resource management application determines to which of the plurality of front-end interfaces to move any target associated with the first front-end interface, based on the compilation of statistics.

4. The storage area according to claim 3, wherein the resource management application is further configured to determine to which of the plurality of front-end interfaces to move any target so as to more evenly balance a data transfer load among the plurality of front-end interfaces.

5. The storage area network according to claim 1, further comprising:
storage configured to maintain an indication of a respective number of targets associated with each of the plurality of front-end interfaces; and
wherein the resource management application determines to which of the plurality of front-end interfaces to move any target associated with the front-end interface based on the indication of the number of targets associated with each of the plurality of front-end interfaces.

6. The storage area network according to claim 1, wherein all targets associated with the first front-end interface are determined to be moved to a single other one of the plurality of front-end interfaces.

7. The storage area network according to claim 1, wherein the resource management application is configured to be responsive to a failure detected with respect to the first front-end interface.

8. The storage area network according to claim 1, wherein the physical location of the particular storage controller relates to one of: a computer rack in which the particular storage controller is located, a room in which the particular storage controller is located, a building in which the particular storage controller is located, and a geographical area in which the particular storage controller is located.

9. The storage area network according to claim 1, wherein:
each of the plurality of storage controllers maintains a respective indication of an ownership relationship between each of the plurality of front-end interfaces and each of the targets, and
the resource management application is further configured to move any target associated with the first front-end interface, wherein moving a particular target associated with the first front-end interface so as to be associated with a second front-end interface includes changing the indicated relationship, for that particular target, from the first front-end interface to the second front-end interface.

10. A method, in a storage area network comprising plural loosely-coupled redundant controllers comprising a plurality of front-end interfaces, for determining to which fail-over front-end interface to map a target associated with a first front-end interface, comprising the steps of:
identifying an operational failure that affects the first front-end interface on a first controller;
identifying one or more targets owned by the first front-end interface, wherein each target is a virtual disk presented to a server via the storage area network; and
determining, for each identified target, a respective fail-over front-end interface; wherein the step of determining further includes the steps of:
determining information relating to the physical location of each of the plurality of front-end interfaces; and
identifying each respective fail-over interface based on at least a portion of the determined information relating to physical location.

11. The method according to claim 10, further comprising the steps of:
modifying ownership information of the identified one or more targets such that each of the one or more targets are no longer associated with the first front-end interface but are associated with their respective fail-over front-end interface; and
updating respective configuration information used by each of the redundant controllers to reflect the modified ownership information of the identified one or more targets.

12. The method according to claim 10, wherein the step of determining further includes the steps of:
analyzing operational statistics regarding the plurality of front-end interfaces; and
identifying each respective fail-over front-end interface in order to more evenly distribute a data transfer load among the plurality of front-end interfaces.

13. The method according to claim 10, wherein the step of determining further includes the step of:
storing a table which indicates for each of the plurality of front-end interfaces a respective predetermined fail-over front-end interface, and
identifying each respective fail-over front-end interface based on the table.

* * * * *